(12) United States Patent
Nakajima et al.

(10) Patent No.: US 12,515,861 B2
(45) Date of Patent: Jan. 6, 2026

(54) SEALANT, BAG FOR TRANSPORTING AND PACKAGING OF SILICON MATERIAL

(71) Applicant: DAI NIPPON PRINTING CO., LTD., Tokyo (JP)

(72) Inventors: Hiroyoshi Nakajima, Tokyo (JP); Katsuyuki Motai, Tokyo (JP); Yuka Tachikawa, Tokyo (JP); Makoto Mizoshiri, Tokyo (JP); Kazushi Sato, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 393 days.

(21) Appl. No.: 17/637,901

(22) PCT Filed: Aug. 27, 2020

(86) PCT No.: PCT/JP2020/032431
§ 371 (c)(1),
(2) Date: May 11, 2022

(87) PCT Pub. No.: WO2021/039922
PCT Pub. Date: Mar. 4, 2021

(65) Prior Publication Data
US 2022/0297913 A1    Sep. 22, 2022

(30) Foreign Application Priority Data

Aug. 30, 2019 (JP) .................................. 2019-159111
Nov. 11, 2019 (JP) .................................. 2019-203944

(51) Int. Cl.
*B65D 75/26* (2006.01)
*B32B 27/34* (2006.01)
(Continued)

(52) U.S. Cl.
CPC .............. *B65D 75/26* (2013.01); *B32B 27/34* (2013.01); *B32B 27/40* (2013.01); *B65D 33/00* (2013.01);
(Continued)

(58) Field of Classification Search
None
See application file for complete search history.

(56) References Cited

U.S. PATENT DOCUMENTS

2008/0090037 A1    4/2008  Masuda
2008/0299364 A1*  12/2008  Nilsen .................... B32B 27/08
                                                                   428/213

(Continued)

FOREIGN PATENT DOCUMENTS

CN    206125921 U    4/2017
JP    H10-264930 A   10/1998
(Continued)

OTHER PUBLICATIONS

English Translation of Nov. 3, 2023, Office Action issued in Taiwanese Patent Application No. 109129545.
(Continued)

*Primary Examiner* — Ramsey Zacharia
(74) *Attorney, Agent, or Firm* — Oliff PLC

(57) ABSTRACT

A packaging material used for a bag for transporting of a silicon material is a laminate in which a first resin base, barrier, second resin base, resin, and sealant layers are laminated in that order. A resin layer indentation elastic modulus is smaller than an indentation elastic modulus of each of the first and second resin base layers by one or more orders of magnitude, a sealant layer indentation elastic modulus is smaller than a first resin base layer indentation elastic modulus of and a second resin base layer indentation elastic modulus by one or more orders of magnitude, and a (Continued)

difference between the first resin base layer indentation elastic modulus and the second resin base layer indentation elastic modulus is smaller than a difference between the second resin base layer indentation elastic modulus and the indentation elastic modulus of the resin layer.

3 Claims, 19 Drawing Sheets

(51) Int. Cl.
  *B32B 27/40* (2006.01)
  *B65D 33/00* (2006.01)
  *B65D 77/04* (2006.01)
  *B65D 81/18* (2006.01)

(52) U.S. Cl.
  CPC .............. *B65D 77/04* (2013.01); *B65D 81/18* (2013.01); *B65D 2577/041* (2013.01)

(56) References Cited

U.S. PATENT DOCUMENTS

| | | | | |
|---|---|---|---|---|
| 2012/0130019 | A1* | 5/2012 | Karjala | ................ C08F 210/16 525/240 |
| 2018/0170015 | A1* | 6/2018 | Solis | ...................... B32B 27/08 |
| 2019/0283946 | A1 | 9/2019 | Kudo et al. | |

FOREIGN PATENT DOCUMENTS

| | | | | |
|---|---|---|---|---|
| JP | 2004-115053 | A | 4/2004 | |
| JP | 2004-148633 | A | 5/2004 | |
| JP | 2009-202927 | A | 9/2009 | |
| JP | 2012-035885 | A | 2/2012 | |
| JP | 2012-196796 | A | 10/2012 | |
| JP | 2012-223942 | A | 11/2012 | |
| JP | 2013-136405 | A | 7/2013 | |
| JP | 2014-223947 | A | 12/2014 | |
| JP | 2019-59511 | A | 4/2019 | |
| JP | 6770629 | B1 | 10/2020 | |
| WO | 2018/101464 | A1 | 6/2018 | |
| WO | WO-2018205220 | A1 * | 11/2018 | ............. B32B 27/08 |
| WO | 2019/070078 | A1 | 4/2019 | |

OTHER PUBLICATIONS

Translation of Mar. 29, 2022 Office Action issued in Japanese Patent Application No. 2019-159111.
Mar. 1, 2022 International Preliminary Report on Patentability issued in International Patent Application No. PCT/JP2020/032431.
Jan. 16, 2023 English Translation of Japanese Office Action issued in Japanese Patent Application No. 2020-190923.
Nov. 2, 2020 International Search Report issued in International Patent Application No. PCT/JP2020/032431.
Jul. 21, 2023 Search Report issued in European Patent Application No. 20857575.3.
Sep. 12, 2023 Office Action issued in Chinese Patent Application No. 202080060589.8.
Translation of Apr. 1, 2025 Office Action issued in Japanese Patent Application No. 2020-190923.
Translation of May 19, 2025 Office Action issued in Korean Patent Application No. 10-2022-7010412.

\* cited by examiner

SEALANT, BAG FOR TRANSPORTING AND PACKAGING OF SILICON MATERIAL

TECHNICAL FIELD

The present disclosure relates to a sealant, and a bag for transporting and packaging of a silicon material.

BACKGROUND ART

Since extremely high cleanliness (high purity) is required for silicon wafers used for producing a semiconductor product and the like, silicon materials such as polysilicon, which is a raw material for silicon wafers, and the like during transportation and the like, a plurality of silicon wafers may be stored in a washed resin case or the like, and each resin case may then be packaged in a package and sealed. As a packaging material constituting such a package, a material using linear low density polyethylene (LLDPE) is known.

In addition, a bag used for packing a silicon material or the like may be composed of a packaging material having a barrier function of blocking permeation of oxygen, water vapor, and the like that can alter the contained silicon material. As such a packaging material, a material in which polyethylene terephthalate (PET) is provided on one side of a vapor deposition layer (barrier layer) of aluminum oxide and low density polyethylene (LDPE) or linear low density polyethylene (LLDPE) is provided on the other side is known (refer to PTL 2).

In addition, a silicon material that is packed in a double bag may generally be transported. As such a double-packed bag, a bag including an inner bag composed of a laminate of plastic bags of, for example, polyester, polyamide, and polyolefin, and an outer bag composed of a laminate having a barrier layer such as an aluminum foil or silica-vapor-deposited polyester is known (refer to PTL 3). When a barrier layer is provided in the outer bag, it is possible to obtain a light blocking property, an oxygen gas barrier property, and the like.

CITATION LIST

Patent Literature

[PTL 1] Japanese Patent Application Publication No. 2013-136405
[PTL 2] Japanese Patent Application Publication No. 2004-148633
[PTL 3] Japanese Patent Application Publication No. 2012-223942

SUMMARY OF INVENTION

Technical Problem

One object of the present disclosure is to provide a sealant, a packaging material, a package for transporting of a silicon material and a package of a silicon material which are used in a package for transporting of a silicon material, reduce the amount of volatile components, and improve the sealing strength; a packaging material, a bag for transporting of a silicon material and a package of a silicon material which can prevent cracks from occurring in a barrier layer; and a bag for transporting of a silicon material and a package of a silicon material which can prevent contamination of the contained silicon material, even if an outer bag is damaged during transportation.

Solution to Problem

In order to address the above problem, as one embodiment of the present disclosure, there is provided a packaging material used for a bag for transporting of a silicon material, wherein the packaging material is a laminate in which a first resin base layer, a barrier layer, a second resin base layer, a resin layer, and a sealant layer are laminated in that order, wherein an indentation elastic modulus (MPa) of the resin layer is smaller than an indentation elastic modulus (MPa) of each of the first resin base layer and the second resin base layer by one or more orders of magnitude, wherein an indentation elastic modulus (MPa) of the sealant layer is smaller than an indentation elastic modulus (MPa) of the first resin base layer and an indentation elastic modulus (MPa) of the second resin base layer by one or more orders of magnitude, and wherein a difference between the indentation elastic modulus (MPa) of the first resin base layer and the indentation elastic modulus (MPa) of the second resin base layer is smaller than a difference between the indentation elastic modulus (MPa) of the second resin base layer and the indentation elastic modulus (MPa) of the resin layer.

A difference between the indentation elastic modulus (MPa) of the first resin base layer and the indentation elastic modulus (MPa) of the second resin base layer may be smaller than a difference between the indentation elastic modulus (MPa) of the second resin base layer and the indentation elastic modulus (MPa) of the resin layer by one or more orders of magnitude, and a difference between the indentation elastic modulus (MPa) of the first resin base layer and the indentation elastic modulus (MPa) of the second resin base layer may be 800 MPa or less.

The indentation elastic modulus of the resin material constituting the first resin base layer and the second resin base layer may be in a range of 1,500 MPa to 3,500 MPa, the indentation elastic modulus of the material constituting the sealant layer may be in a range of 300 MPa to 500 MPa, and the resin layer may be composed of polyethylene.

The indentation elastic modulus (MPa) of the resin layer may be smaller than the indentation elastic modulus (MPa) of each of the first resin base layer and the second resin base layer by two or more orders of magnitude, and the resin layer may be composed of a two-component urethane resin adhesive.

The first resin base layer and the second resin base layer may be composed of the same resin material, and the thickness of the resin layer may be 1 μm to 5 μm. A resin material constituting the first resin base layer and a resin material constituting the second resin base layer may be a polyester resin or a polyamide resin, and a resin material constituting the first resin base layer and a resin material constituting the second resin base layer may be a polyester resin. The barrier layer may have transparency, and the barrier layer may contain silica or alumina.

As one embodiment of the present disclosure, there is provided a bag for transporting of a silicon material, wherein the bag for transporting of a silicon material is composed of the packaging material, and wherein the sealant layer is positioned inside the bag for transporting of a silicon material.

As one embodiment of the present disclosure, there is provided a package of a silicon material including the bag for transporting of a silicon material and a silicon material that is accommodated in the bag for transporting of a silicon material.

As one embodiment of the present disclosure, there is provided a bag for transporting of a silicon material, including a first bag and a second bag that is arranged in the first bag, wherein a packaging material constituting the second bag has a barrier layer.

The barrier layer may contain silica or alumina, a packaging material constituting the second bag may be a laminated material including a resin base layer, the barrier layer, and a sealant layer in that order, the sealant layer may be positioned inside the second bag, and the resin base layer may be composed of a polyester resin or a polyamide resin.

A packaging material constituting the second bag may be a laminated material that further includes an adhesive layer positioned between the resin base layer and the barrier layer, a packaging material constituting the second bag may be a laminated material that further includes a resin layer containing a polyester resin positioned between the barrier layer and the sealant layer, a laminated material including a resin base layer, the barrier layer, a resin layer, and a sealant layer in that order, the resin base layer and the resin layer may contain the same resin, and the sealant layer may be positioned inside the second bag or may be transparent.

A packaging material constituting the first bag may be a laminated material including a resin base layer containing a polyester resin and a sealant layer in that order, the sealant layer may be positioned inside the first bag, a packaging material constituting the first bag may be composed of a laminated material that does not contain a barrier layer, and a packaging material constituting the first bag may be composed of a laminated material that does not contain a polyamide resin. The thickness of the resin base layer of the packaging material constituting the first bag may be 8 μm to 30 μm.

As one embodiment of the present disclosure, there is provided a package of a silicon material including the bag for transporting of a silicon material and a silicon material that is accommodated in the second bag of the bag for transporting of a silicon material.

As one embodiment of the present disclosure, there is provided a bag for transporting of a silicon material, including a first bag, and a second bag that is arranged in the first bag, wherein the second bag is arranged in the first bag without being fixed to the first bag, and a packaging material constituting the second bag has a barrier layer.

As one embodiment of the present disclosure, there is provided a bag for transporting of a silicon material including an outer bag and an inner bag that is arranged in the outer bag without being fixed to the outer bag, wherein, in the inner bag, a packaging material constituting the inner bag has a barrier layer.

As one embodiment of the present disclosure, there is provided a sealant used in a package for transporting of a silicon material, including a sealant base having a first surface and a second surface that faces the first surface, wherein the sealant base includes a first part including the first surface and a second part positioned closer to the second surface than the first part, wherein the first part contains low density polyethylene (LDPE), and wherein the second part contains linear low density polyethylene (LLDPE).

The second part may further contain low density polyethylene (LDPE), the sealant base may further include a third part positioned closer to the second surface than the second part, and the third part may contain low density polyethylene (LDPE).

The sealant base may be a laminated structure having at least a first layer including the first part and a second layer including the second part, and may be a single-layer structure having at least the first part and the second part.

The first part may be rich in low density polyethylene (LDPE), the thickness of the second part may be thicker than the thickness of the first part, the low density polyethylene (LDPE) contained in the first part may be low density polyethylene to which substantially no slip agent is added, and the linear low density polyethylene (LLDPE) contained in the second part may be linear low density polyethylene to which substantially no slip agent is added.

As one embodiment of the present disclosure, there is provided a packaging material, including a base composed of a resin material, and the sealant provided on one side of the base, wherein the sealant is provided so that the second surface is brought into contact with one side of the base.

The packaging material may further include a gas barrier layer that is provided on the other side of the base.

As one embodiment of the present disclosure, there is provided a package for transporting of a silicon material composed of the packaging material.

As one embodiment of the present disclosure, there is provided a package of a silicon material including the package for transporting of a silicon material and a silicon material that is accommodated in the package for transporting of a silicon material.

As one embodiment of the present disclosure, there is provided a sealant used in a package for transporting of a silicon material, including a sealant base having a first surface and a second surface that faces the first surface, wherein the sealant base includes a first surface layer including the first surface, a second surface layer including the second surface, and an intermediate layer positioned between the first surface layer and the second surface layer, the first surface layer and the second surface layer contain low density polyethylene (LDPE), the intermediate layer contains linear low density polyethylene (LLDPE), and the indentation elastic modulus of the sealant is in a range of 300 MPa to 500 MPa.

The thickness of the intermediate layer may be thicker than the thickness of the first surface layer and the thickness of the second surface layer.

As one embodiment of the present disclosure, there is provided a sealant used in a package for transporting of a silicon material, including a sealant base having a first surface and a second surface that faces the first surface, wherein the sealant base is a single-layer structure containing low density polyethylene (LDPE) and linear low density polyethylene (LLDPE), and the indentation elastic modulus of the sealant is in a range of 300 MPa to 500 MPa.

Advantageous Effects of Invention

According to the present disclosure, it is possible to provide a sealant, a packaging material, a package for transporting of a silicon material and a package of a silicon material which are used in a package for transporting of a silicon material, reduce the amount of volatile components, and improve the sealing strength; a packaging material, a bag for transporting of a silicon material and a package of a silicon material which can prevent cracks from occurring in a barrier layer; and a bag for transporting of a silicon material and a package of a silicon material which can prevent contamination of the contained silicon material, even if an outer bag is damaged during transportation.

DESCRIPTION OF EMBODIMENTS

Embodiments of the present disclosure will be described with reference to the drawings.

In the appended drawings in this specification, in order to facilitate understanding, the shape, scale, aspect ratio and the like of respective parts may be changed or exaggerated compared with those in actual products. In this specification and the like, when a numerical range is indicated using "to," this means that the numerical values stated before and after "to" are included as a lower limit value and an upper limit value. In this specification and the like, terms such as "film," "sheet," and "plate" are not distinguished from each other based on the difference in name. For example, the concept of "plate" includes members that can be generally called a "sheet" or "film."

Figure 1:
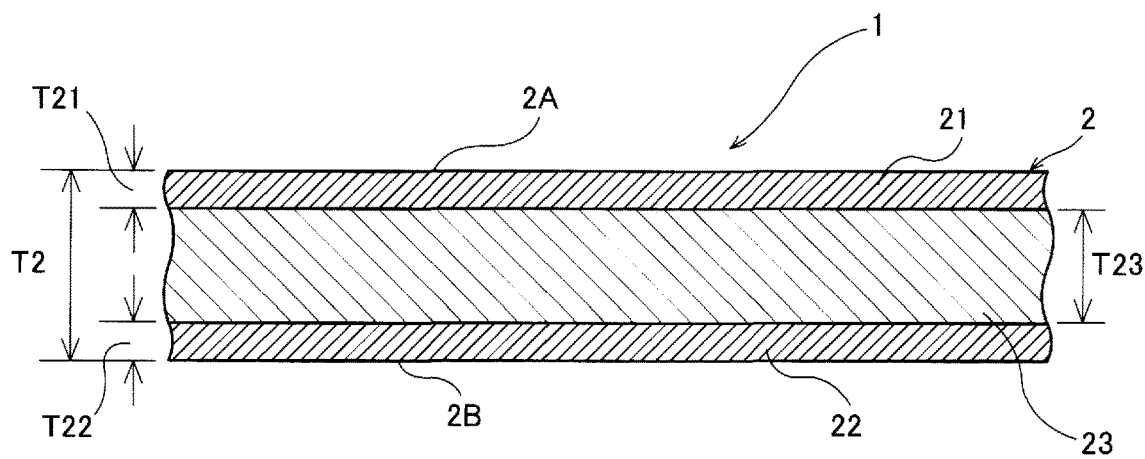
FIG. 1 is a partially enlarged cut end view showing a schematic configuration of one form of a sealant according to one embodiment of the present disclosure.
Figure 2:
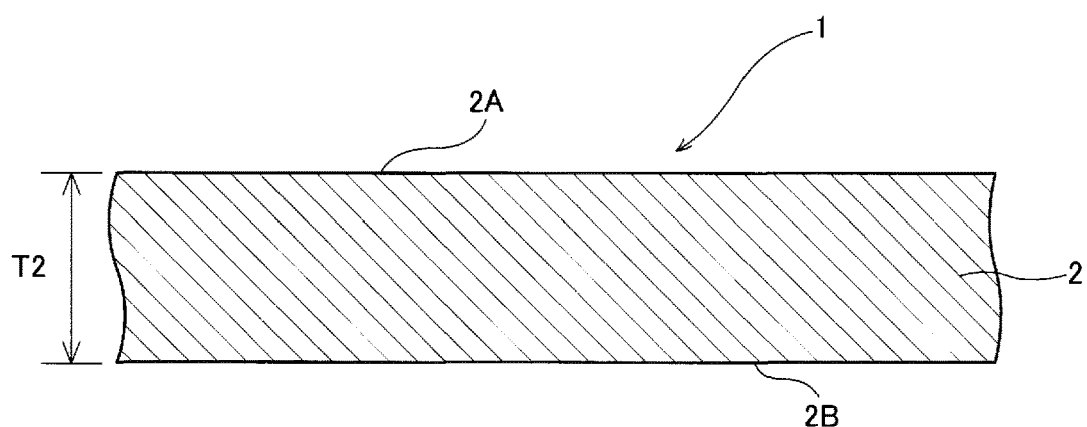
FIG. 2 is a partially enlarged cut end view showing a schematic configuration of another form of the sealant according to one embodiment of the present disclosure.

As shown in FIG. 1 and FIG. 2, a sealant 1 according to the present embodiment is for a package used when a silicon material is transported (package for transporting of a silicon material), and has a sealant base 2 including a first surface 2A and a second surface 2B that faces the first surface 2A. The sealant base 2 may be a laminated structure having a first surface layer 21 positioned on the side of the first surface 2A, a second surface layer 22 positioned on the side of the second surface 2B, and an intermediate layer 23 interposed between the first surface layer 21 and the second surface layer 22 (refer to FIG. 1), or may be a single-layer structure having the first surface 2A and the second surface 2B (refer to FIG. 2).

In the form shown in FIG. 1, the first surface layer 21 positioned on the side of the first surface 2A is a layer containing low density polyethylene (LDPE) to which substantially no slip agent is added. The second surface layer 22 positioned on the side of the second surface 2B is, for example, a layer containing low density polyethylene (LDPE) to which substantially no slip agent is added, like the first surface layer 21, and the intermediate layer 23 interposed between the first surface layer 21 and the second surface layer 22 is, for example, a layer containing linear low density polyethylene (LLDPE) to which substantially no slip agent is added. Here, in the present embodiment, "substantially no slip agent is added" means that the amount of an added component that actually improves the slipperiness of a surface of a sealant as a slip agent does not exceed an amount that actually affects the slipperiness of the surface of the sealant for the purpose of actually affecting the slipperiness of the surface of the sealant. Examples of slip agents include particles such as calcium carbonate and talc, and surfactants such as a silicone resin and a quaternary ammonium salt compound.

If volatile components derived from the sealant 1 (an outgas component derived from the sealant 1 and the like) positioned on the innermost layer of a package for transporting of a silicon material adhere to a contained polysilicon or silicon wafer, there is a risk of defects occurring in a semiconductor device produced using the silicon wafer. Therefore, it is desirable that the amount of the volatile components derived from the sealant 1 be as small as possible. In order to reduce the amount of the volatile components derived from the sealant 1, it is desirable that the thickness T2 of the sealant 1 be as thin as possible. When the thickness T2 of the sealant 1 is made relatively thin, since the volatile components derived from the sealant 1 are released to the outside of the film, it is possible to reduce the amount of the volatile components derived from the sealant 1. On the other hand, when the thickness T2 of the sealant 1 is too thin, the resistance with respect to mechanical properties such as tensile strength may deteriorate, and there is a risk of a function of a bag for packing the contents deteriorating. In this regard, since linear low density polyethylene (LLDPE) has higher elasticity and higher resistance to bending than low density polyethylene (LDPE), if linear low density polyethylene (LLDPE) is used as the sealant 1, the thickness T2 of the sealant 1 can be made relatively thin.

In addition, after a resin case 51 (refer to FIG. 7) is accommodated in a package 10 for transporting of a silicon material (refer to FIG. 6), since degassing is performed from the package 10 and packing is then performed, the sealant 1 contained in a packaging material 3 (refer to FIG. 3 and FIG. 4) constituting the package 10 is required to have improved followability. In this regard, since linear low density polyethylene (LLDPE) has relatively high elasticity, if the linear low density polyethylene (LLDPE) is used, the followability of the sealant 1 can be improved.

It is thought that, when the sealant is composed of a single layer of linear low density polyethylene (LLDPE), since the indentation elastic modulus of the sealant composed of a single layer of linear low density polyethylene (LLDPE) can be adjusted to about 150 MPa to 600 MPa, the thickness of the sealant can be thinned. In addition, even in consideration of improving followability of the sealant, it can be said that it is preferable that the sealant be composed of a single layer of linear low density polyethylene (LLDPE). However, since the pressure during polymerization of linear low density polyethylene (LLDPE) is lower than the pressure during polymerization of low density polyethylene (LDPE), low-molecular-weight components are more likely to volatilize in linear low density polyethylene (LLDPE) than in low density polyethylene (LDPE). Therefore, it is thought that, if the sealant is composed of a single layer of linear low density polyethylene (LLDPE), even if the thickness of the sealant can be thinned, there is a risk of volatile components derived from the sealant contaminating the silicon material. In addition, it is thought that, since linear low density polyethylene (LLDPE) tends to be less slippery than low density polyethylene (LDPE), if the sealant is composed of a single layer of linear low density polyethylene (LLDPE), there is a risk of the slipperiness of the surface of the sealant being reduced. Since it is preferable that a slip agent, which may become a foreign substance, be not substantially added to the sealant used for the package for transporting of a silicon material, it is preferable to improve the slipperiness by a method other than use of the slip agent. In the present embodiment, the intermediate layer 23 containing linear low density polyethylene (LLDPE) is interposed between the first surface layer 21 and the second surface layer 22 which contain low density polyethylene (LDPE). Therefore, according to the sealant 1 according to the present embodiment, the thickness T2 can be made relatively thin, the followability and slipperiness are improved, and it is possible to prevent low-molecular-weight components from volatilizing from linear low density polyethylene (LLDPE) contained in the intermediate layer 23.

In the sealant 1 shown in FIG. 2, the sealant base 2 having a single-layer structure contains low density polyethylene (LDPE) and linear low density polyethylene (LLDPE). In the sealant base 2, the mixing ratio of low density polyethylene (LDPE) and linear low density polyethylene (LLDPE) may be about 50:50 to 70:30. In this manner, when the amount of low density polyethylene (LDPE) added is equal to or larger than the amount of linear low density polyethylene (LLDPE) added, and preferably, when the amount of LDPE added is larger than the amount of LLDPE added, the abundance of low density polyethylene (LDPE) on the side of the first surface 2A of the sealant base 2 can increase, and an effect of thinning the thickness T2 of the sealant 1 due to linear low density polyethylene (LLDPE), that is, an effect of preventing low-molecular-weight components from volatilizing, is achieved. Here, when viewed in a thickness direction of the sealant base 2, low density polyethylene (LDPE) and linear low density polyethylene (LLDPE) may be substantially uniformly provided, and low density polyethylene (LDPE) may be unevenly distributed on the side of the first surface 2A and on the side of the second surface 2B.

The thickness T2 of the sealant 1 according to the present embodiment can be appropriately set according to the thickness of the package 10 for transporting of a silicon material (refer to FIG. 6) composed of the packaging material 3 (refer to FIG. 3 and FIG. 4) containing the sealant 1 and the like, and may be, for example, about 35 µm to 60 µm.

In the form shown in FIG. 1, when the first surface layer 21 containing low density polyethylene (LDPE) and the second surface layer 22 containing low density polyethylene (LDPE) are arranged with the intermediate layer 23 interposed therebetween, the internal stress on one side of the sealant 1 and the internal stress on the other side thereof cancel each other out to some extent, and curling of the sealant 1 can be minimized. In addition, in the form shown in FIG. 1, the thicknesses T21 and T22 of the first surface layer 21 and the second surface layer 22 are both thinner than the thickness T23 of the intermediate layer 23. Since the thicknesses T21 and T22 of the first surface layer 21 and the second surface layer 22 are thinner than the thickness T23 of the intermediate layer 23, predetermined followability can be imparted to the sealant 1. The ratio of the thickness T21 of the first surface layer 21 and the thickness T23 of the intermediate layer 23 may be about 1:1 to 10, and is preferably about 1:2 to 3. When the ratio of the thicknesses is within the above range, sufficient followability due to low density linear polyethylene (LLDPE) contained in the intermediate layer 23 can be imparted to the sealant 1, and the indentation elastic modulus of the sealant 1 can be within a range of 300 MPa to 500 MPa. Here, the indentation elastic modulus can be measured using a micro-hardness tester (product name "PICODENTOR HM500," commercially available from Fischer Instruments K.K.). In the form shown in FIG. 2, since the mixing ratio of low density polyethylene (LDPE) and linear low density polyethylene (LLDPE) is 50:50 to 70:30, the indentation elastic modulus of the sealant 1 can be within a range of 300 MPa to 500 MPa.

It is known that the sealing strength of the sealant can be controlled by the sealing temperature, the sealing pressure, the sealing time and the like during heat sealing. Generally, when the sealing temperature is higher, the sealing strength tends to be higher, but if the sealing temperature is too high, the sealant melts more than necessary, and there is a risk of the sealing strength being lowered. In the present embodiment, under heat sealing conditions of a sealing temperature of 150° C., a sealing pressure of 0.1 MPa, and a sealing time of 1 second, the sealing strength when the first surfaces 2A of the sealant 1 are sealed to each other may be 30 N/15 mm or more, and is preferably 50 N/15 mm or more and less than 60 N/15 mm. When the sealing strength is less than 30 N/15 mm, during transportation of the silicon material packaged in the package 10 for transporting (refer to FIG. 6) of the silicon material composed of the packaging material 3 (refer to FIG. 3 and FIG. 4) having the sealant 1, there is a risk of a heat-sealed part (for example, a top heat-sealed part HST (refer to FIG. 7)) of the package 10 for transporting of the silicon material being peeled off.

As described above, it is thought that, in order to make the thickness T2 of the sealant 1 relatively thin, it is preferable to use linear low density polyethylene (LLDPE) as a constituent material of the sealant 1. However, in a sealant composed of linear low density polyethylene (LLDPE), the sealing temperature required to obtain a predetermined sealing strength becomes relatively high. In this regard, in the present embodiment, when the first surface layer 21 of the sealant 1 contains low density polyethylene (LDPE), the sealing temperature required to obtain a predetermined sealing strength can be relatively lowered.

The haze of the sealant 1 according to the present embodiment may be 25% or less, and is preferably 20% or less. When the haze of the sealant 1 is 20% or less, the visibility inside the package 10 for transporting (refer to FIG. 6) of the silicon material produced from the packaging material 3 having the sealant 1 can be improved. In addition, before the silicon material is packaged in the package for transporting of a silicon material, it is possible to check whether a foreign substance is adhered to the first surface 2A of the sealant 1, and it is also possible to prevent contamination of the silicon material before it happens. Here, the haze of the sealant 1 can be measured according to JIS-K 7136 using, for example, a haze meter (product name: HM-150, commercially available from Murakami Color Research Laboratory Co., Ltd.).

The sealant 1 having the above configuration can be produced using a conventionally known film forming method. For example, the sealant 1 having the configuration shown in FIG. 1 can be produced by laminating the second surface layer 22, the intermediate layer 23, and the first surface layer 21 using a coating method such as a die coating method and an inflation method. Similarly, the sealant 1 having the configuration shown in FIG. 2 can be produced using the above coating method, extrusion inflation method, or the like.

Here, the sealant 1 having the configuration shown in FIG. 1 (the first surface layer 21 (film thickness: 8 µm), the intermediate layer 23 (film thickness: 24 µm), and the second surface layer 22 (film thickness: 8 µm)) was prepared (sample 1) by a multi-layer coextrusion inflation film formation method using low density polyethylene (LDPE to which substantially no slip agent is added, product name: UBE polyethylene B128, commercially available from Ube-Maruzen Polyethylene Co., Ltd.) as a constituent material of the first surface layer 21, a melted mixture (mixing ratio=1:1 (mass basis)) containing low density polyethylene (LDPE to which substantially no slip agent is added, product name: UBE polyethylene B128, commercially available from Ube-Maruzen Polyethylene Co., Ltd.) and linear low density polyethylene (LLDPE to which substantially no slip agent is added, product name: ULT-ZEX 3500ZA, commercially available from Prime Polymer Co., Ltd.) as a constituent material of the intermediate layer 23, and low density polyethylene (LDPE to which substantially no slip agent is added, product name: UBE polyethylene B128, commercially available from Ube-Maruzen Polyethylene Co., Ltd.) as a constituent material of the second surface layer 22.

In addition, the sealant 1 (thickness: 40 µm) having the configuration shown in FIG. 2 was prepared (sample 2) according to an inflation film formation method by melt-mixing pellets of low density polyethylene (LDPE to which substantially no slip agent is added, product name: UBE polyethylene B128, commercially available from Ube-Maruzen Polyethylene Co., Ltd.) and pellets of linear low density polyethylene (LLDPE to which substantially no slip agent is added, product name: ULT-ZEX 3500ZA, commercially available from Prime Polymer Co., Ltd.) at a mixing ratio of 7:3 (mass basis).

In addition, a sealant (thickness: 50 µm) composed of additive-free linear low density polyethylene (additive-free LLDPE, product name: NB-1, commercially available from Tamapoly Co., Ltd.) was prepared (sample 3).

Figure 9A:
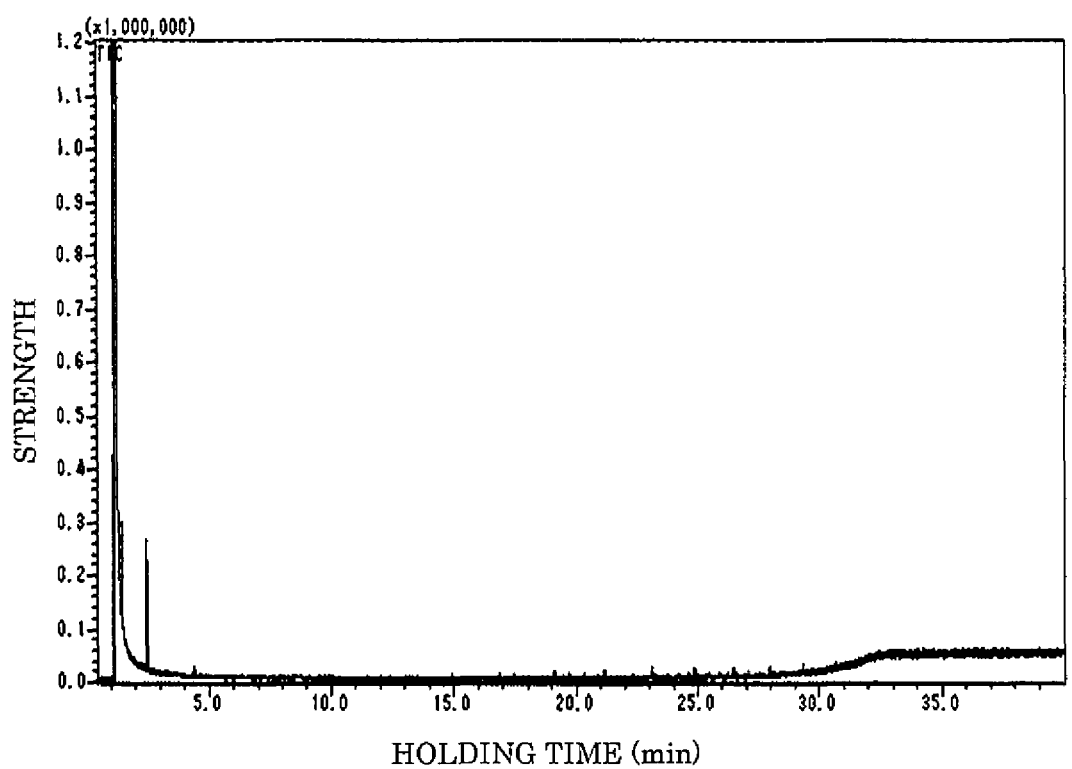
FIG. 9A is a mass spectrum showing the results of GC/MS analysis of a sample 1.
Figure 9B:
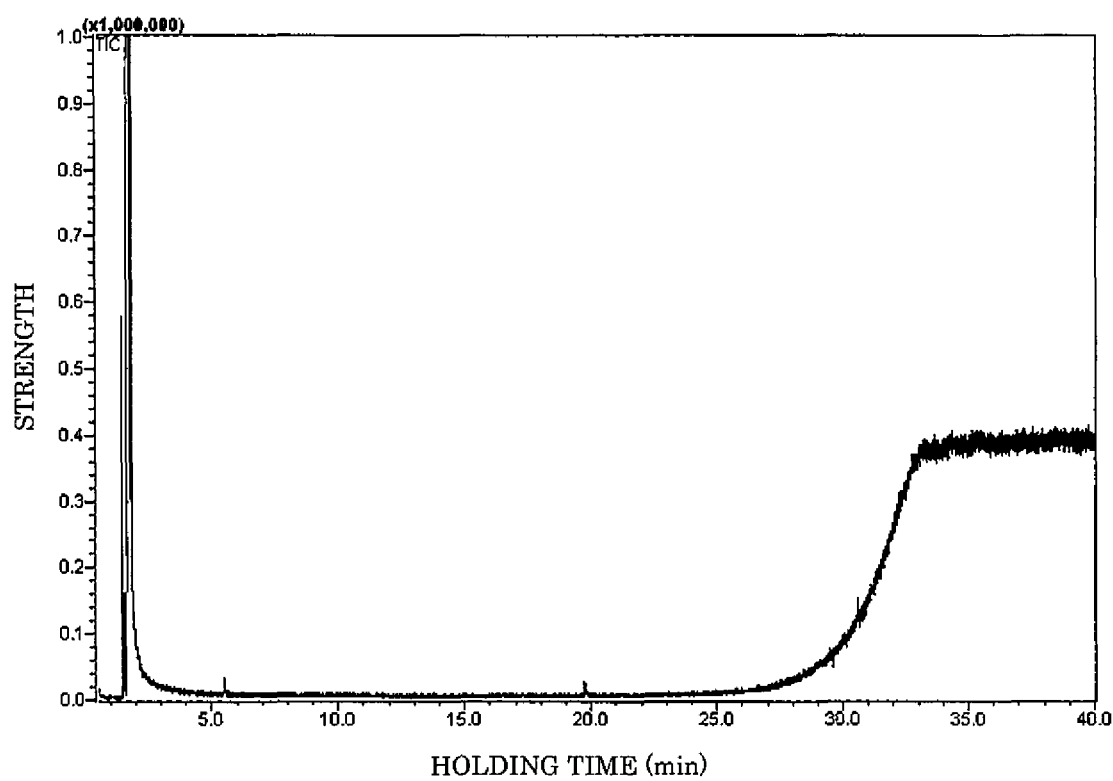
FIG. 9B is a mass spectrum showing the results of GC/MS analysis of a sample 2.
Figure 9C:
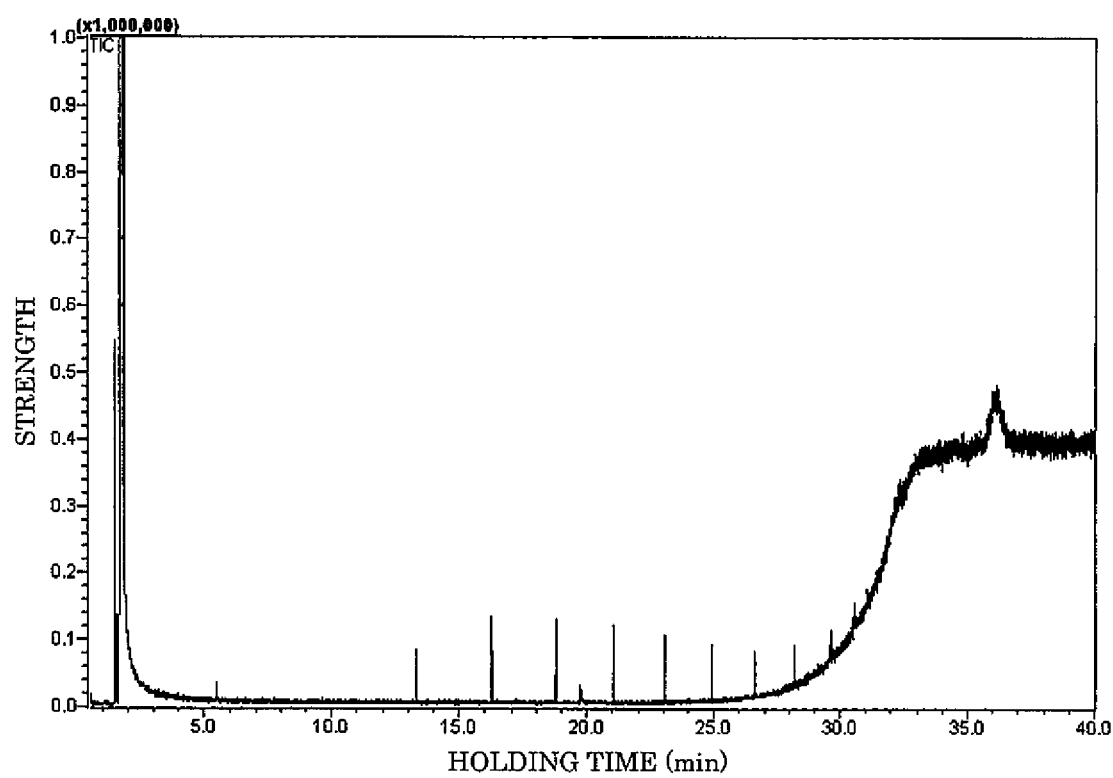
FIG. 9C is a mass spectrum showing the results of GC/MS analysis of a sample 3.

Sections obtained by cutting the sealants of the samples 1 to 3 into a size of 100 mm×25 mm were immersed in ethanol at 60° C. for 1 week, volatile components from the sections were then analyzed through GC/MS under the following conditions to obtain mass spectrums. The obtained mass spectrums are shown in FIG. 9A to FIG. 9C.

<GC/MS Conditions>

Gas chromatograph: GCMS-QP2010 (commercially available from Shimadzu Corporation)
Column: 670-15003-03 (length: 30 mm, inner diameter: 0.25 mm, commercially available from Shimadzu Corporation)
Column oven temperature: 50° C.
Injection amount: 1 μL
Carrier gas: He (57.1 mL/min)
Vaporization chamber temperature setting: 300° C.
Measurement mode: split As in the mass spectrums shown in FIG. 9A to FIG. 9C, no volatile components were detected in the sealants 1 of the sample 1 and the sample 2, but volatile components were detected in the sealant of the sample 3. Like the sample 1 and the sample 2, it can be inferred that, when the first surface layer 21 positioned on the side of the first surface 2A contains low density polyethylene (LDPE), and the intermediate layer 23 positioned on the side of the second surface 2B contains linear low density polyethylene (LLDPE), it is possible to prevent low-molecular-weight components from volatilizing from the sealant 1.

In addition, the indentation elastic modulus of the sections obtained by cutting the sealants of the samples 1 to 3 to a desired size was measured under an atmosphere at a temperature of 23° C.±2° C. and a humidity of 60% RH±5% RH according to ISO14577: 2015. First, fixing was performed on a commercially available glass slide (hereinafter referred to as a "first glass slide") via an adhesive resin (product name "Aron Alpha (registered trademark) for general use", commercially available from Toagosei Co., Ltd.) so that the first surface 2A of the section cut to a size of 20 mm×20 mm became the upper surface. Specifically, the adhesive resin was added dropwise to the center part of the first glass slide (product name "Microscope slides (cut edge type) 1-9645-11," commercially available from As One Corporation). In this case, one drop of the adhesive resin was added dropwise so that the adhesive resin did not spread, and as will be described below, the adhesive resin did not protrude from the section when spread out. Then, the section was brought into contact with the first glass slide so that the side of the first surface 2A became the upper surface, and the adhesive resin was positioned at the center part of the section, and the adhesive resin was spread between the first glass slide and the section, and temporarily adhered. Then, another new glass slide (hereinafter referred to as a "second glass slide") was placed on the section to obtain a laminate of first glass slide/adhesive resin/section/second glass slide. Then, a weight of 30 g or more and 50 g or less was placed on the second glass slide, and left at room temperature for 12 hours. Then, the weight and the second glass slide were removed, and the result was used as a measurement sample. Then, this measurement sample was fixed to the measurement stage of a micro-hardness tester (product name: PICODENTOR HM500, commercially available from Fischer Instruments K.K.) installed in parallel with a vibration-free pedestal. For this fixing, 4 sides of the first glass slide were fixed with a tape (product name: Cellotape (registered trademark), commercially available from Nichiban Co., Ltd.) so that the measurement sample did not move. Next, on the first surface 2A of the section, the indentation elastic modulus (MPa) was measured under conditions of an indentation speed of 0.15 μm/sec, an indentation depth of 3 μm, a holding time of 5 seconds, and a drawing speed of 0.15 μm/sec using an ultra-micro load hardness tester (PICODENTOR HM500, commercially available from Fischer Instruments K.K.) in which a Vickers indenter (a diamond indenter having a regular quadrangular pyramid with a facing angle of 136°) was installed. In one section, measurement was performed at at least five different points, and an average of these measured values was taken as a value of the indentation elastic modulus for the sealant under the conditions. The results are shown in Table 1.

TABLE 1

|  | Indentation elastic modulus (Mpa) |
|---|---|
| Sample 1 | 457.3 |
| Sample 2 | 371.6 |
| Sample 3 | 159.0 |

As can be clearly understood from the results shown in Table 1, it is inferred that, although the indentation elastic modulus of the sample 1 and the sample 2 is larger than the indentation elastic modulus of the sample 3, practically, they have elasticity to the extent that sufficient followability can be exhibited, and also have bending resistance. In addition, it is inferred that the sealants of the sample 1 and the sample 2 can secure sufficient transparency.

In addition, the first surfaces of the sealants of the samples 1 to 3 were heat-sealed to each other at a sealing temperature of 110° C., 120° C., 130° C., 140° C. and 150° C., heat seal test pieces having a width of 15 mm having a heat-sealed part were collected, and the sealing strength (N/15 mm) of the heat seal test piece at each sealing temperature was determined according to JIS-Z 1711.

TABLE 2

| Sealing temperature | Sealing strength (N/15 mm) | | |
|---|---|---|---|
| (° C.) | Sample 1 | Sample 2 | Sample 3 |
| 110 | 0 | 0 | 0 |
| 120 | 1 | 0.8 | 0 |
| 130 | 13.7 | 9.4 | 2.3 |
| 140 | 26.1 | 55.7 | 9.2 |
| 150 | 34.1 | 58.8 | 54.4 |

As can be clearly understood from the results shown in Table 2, it is inferred that, in the sealants 1 of the sample 1 and the sample 2, a higher sealing strength can be obtained at a lower sealing temperature than that of the sealant of the sample 3. Here, under conditions of a sealing temperature of 110° C. and 120° C., neither of the samples 1 to 3 had a satisfactory sealing strength.

Figure 3:
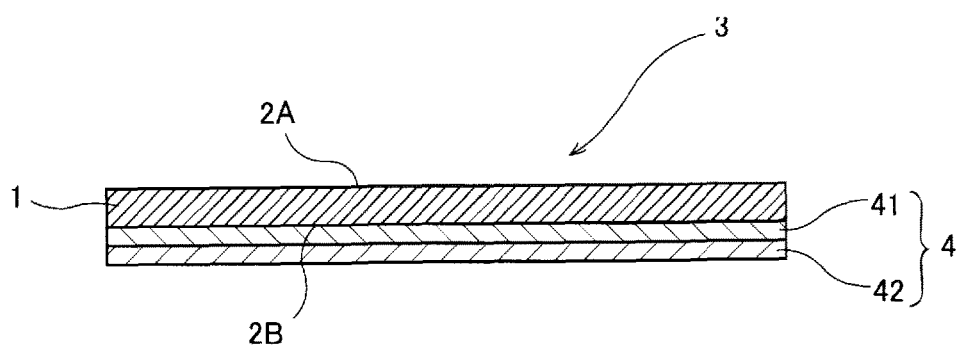
FIG. 3 is a partially enlarged cut end view showing a schematic configuration of one form of a packaging material according to one embodiment of the present disclosure.

As shown in FIG. 3, the packaging material 3 in the present embodiment has a multi-layer structure in which the sealant 1 is laminated so that the second surface 2B is brought into contact with one side of a base 4.

The base 4 is composed of, for example, one resin material selected from among polyethylene (PE), polyethylene terephthalate (PET), nylon (registered trademark, Ny), polybutylene terephthalate (PBT), and the like, or a laminate of two or more types of the resin materials. Here, in the example shown in FIG. 3, the base 4 is composed of a laminate of two resin materials (a first resin layer 41 and a second resin layer 42), and the first resin layer 41 functions as an adhere layer for the second surface 2B of the sealant 1. In this case, for example, the first resin layer 41 may be composed of polyethylene (PE), and the second resin layer 42 may be composed of polyethylene terephthalate (PET).

When the silicon material is packaged in the package 10 for transporting (refer to FIG. 6) of the silicon material produced from the packaging material 3, the sealant 1 in the packaging material 3 has transparency to the extent that the inside of the package 10 can be visually recognized. Therefore, in the packaging material 3 having the sealant 1, similarly, it is desirable to have transparency to the extent that the inside of the package 10 can be visually recognized. In such a point of view, the haze of the packaging material 3 in the present embodiment may be, for example, 30% or less, and is preferably 25% or less. When the haze of the packaging material 3 exceeds 30%, the visibility inside the package 10 for transporting of the silicon material produced from the packaging material 3 deteriorates, and there is a risk that it will be difficult to check whether a foreign substance is adhered to the first surface 2A of the sealant 1 in the package 10 for transporting of the silicon material. Here, the haze of the packaging material 3 can be measured according to JIS-K 7136 using, for example, a haze meter (product name: HM-150, commercially available from Murakami Color Research Laboratory Co., Ltd.).

Figure 4:
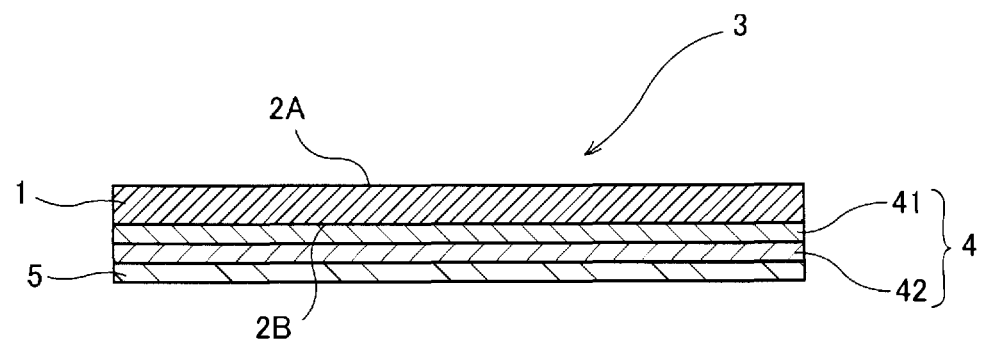
FIG. 4 is a partially enlarged cut end view showing a schematic configuration of another form of the packaging material according to one embodiment of the present disclosure.

In the present embodiment, a gas barrier layer 5 may be provided on the other side of the base 4 (refer to FIG. 4). When the gas barrier layer 5 is provided, it is possible to prevent a gas or the like that contaminates the surface of the silicon material from entering from the outside of the package 10 for transporting (refer to FIG. 6) of the silicon material produced from the packaging material 3. The gas barrier layer 5 may be, for example, a vapor deposition film formed by vapor-depositing an inorganic oxide such as silica or alumina on a resin layer (for example, a PET layer). In addition, the packaging material 3 may have a metal vapor deposition film formed by vapor-depositing a metal such as aluminum or a metal foil such as aluminum on the other side of the base 4. When such a metal vapor deposition film or metal foil is provided on the other side of the base 4, transparency is not secured in the packaging material 3, but not only a gas barrier property but also a light shielding property can be imparted to the package 10 for transporting of the silicon material produced from the packaging material 3. In addition, in this form, when the sealant 1 provided on one side of the base 4 has predetermined transparency, it is possible to more easily check whether a foreign substance is adhered to the first surface 2A of the sealant 1 in the package 10 for transporting of the silicon material prepared from the packaging material 3.

Figure 5:
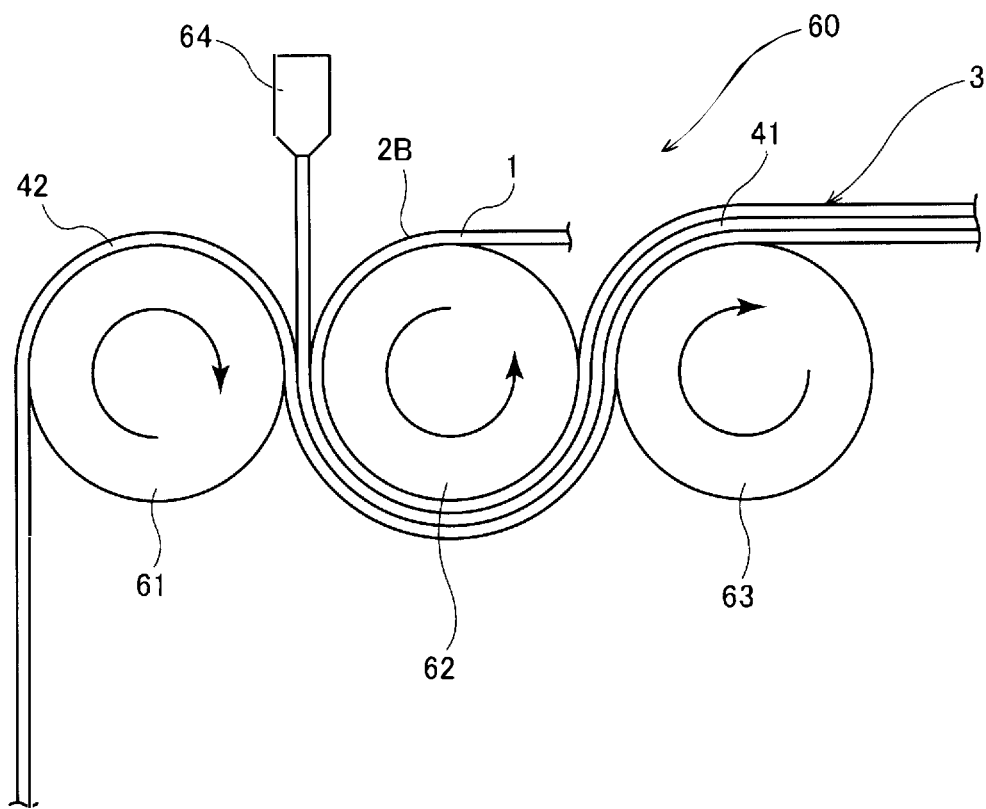
FIG. 5 is a schematic view schematically showing a configuration of an example of a production device that can produce a packaging material according to one embodiment of the present disclosure.

The packaging material 3 having the above configuration may be prepared by a conventionally known method of preparing a film or the like, and for example, as shown in FIG. 5, it can be prepared using a production device 60 including a first roller 61, a second roller 62, a third roller 63 and a T die 64. In the production device 60, a resin material constituting the first resin layer 41 is extruded in a film form from the T die 64 between the second surface 2B and the second resin layer 42 of the sealant 1, planar-pressure-welded by the first roller 61, the second roller 62 and the third roller 63, and cooled to prepare the packaging material 3.

Figure 6:
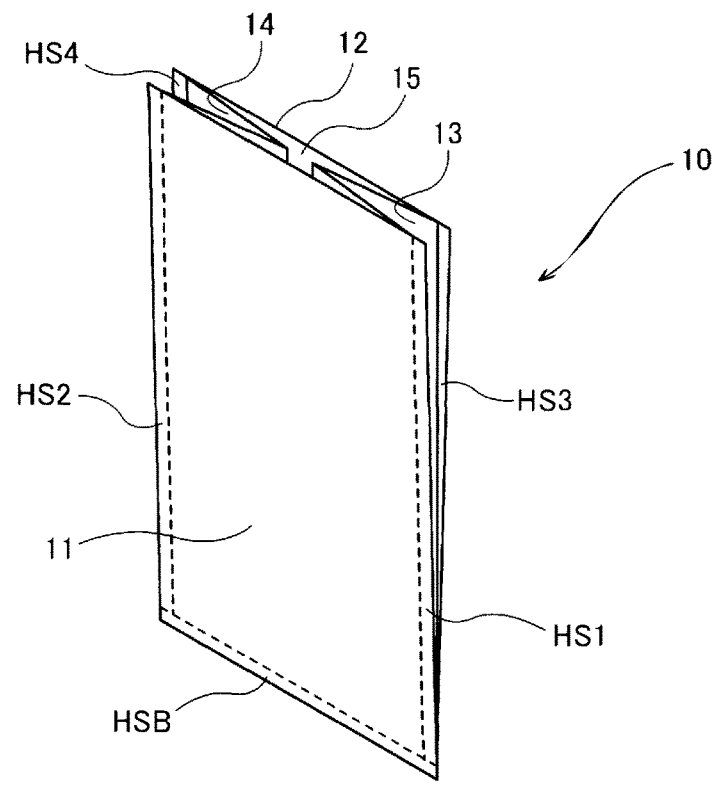
FIG. 6 is a perspective view showing a schematic configuration of a package for transporting of a silicon material according to one embodiment of the present disclosure.
Figure 7:
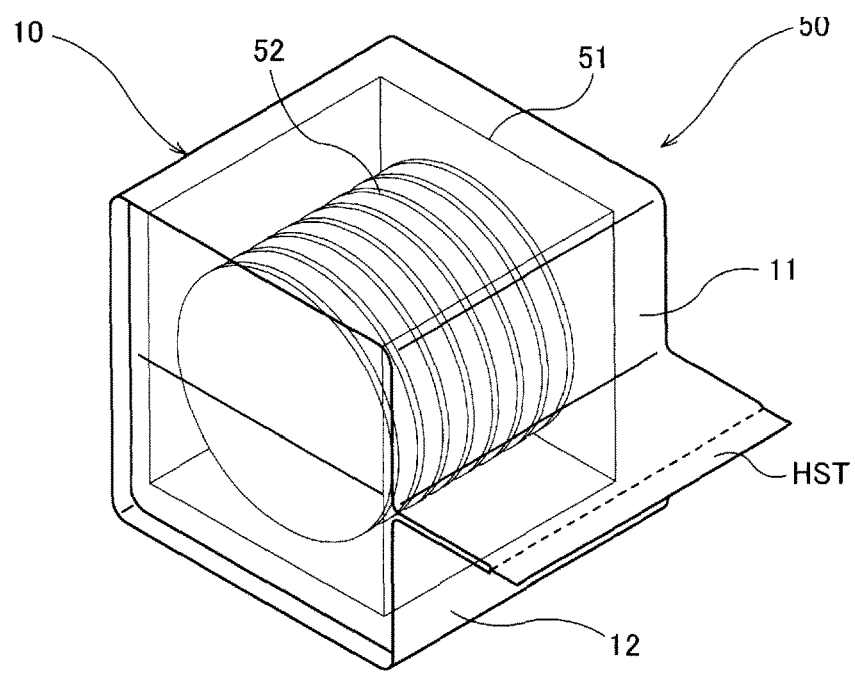
FIG. 7 is a perspective view showing a schematic configuration of a package of a silicon material according to one embodiment of the present disclosure.

As shown in FIG. 6, the package 10 for transporting of a silicon material in the present embodiment is a packaging bag that becomes substantially rectangular (substantially rectangular parallelepiped) when it is unfolded, and is composed of a first side surface film 11, a second side surface film 12, a first gusset film 13 and a second gusset film 14. The first side surface film 11, the second side surface film 12, the first gusset film 13 and the second gusset film 14 are all composed of the packaging material 3. The package 10 for transporting of a silicon material has a configuration in which the first surface 2A of the sealant 1 of any of the first side surface film 11, the second side surface film 12, the first gusset film 13 and the second gusset film 14 is positioned on the innermost surface, and the other side of the base 4 is positioned on the outermost surface.

In the package 10 for transporting of a silicon material, a first heat-sealed part HS1 formed by superimposing one of two opposing side edges of the first side surface film 11 and one of two opposing side edges of the folded first gusset film 13, and welding them by heat sealing is formed, and a second heat-sealed part HS2 formed by superimposing the other of the side edges of the first side surface film 11 and one of two opposing side edges of the folded second gusset film 14, and welding them by heat sealing is formed. In addition, a third heat-sealed part HS3 formed by superimposing one of two opposing side edges of the second side surface film 12 and the other of the side edges of the folded first gusset film 13, and welding them by heat sealing is formed, and a fourth heat-sealed part HS4 formed by superimposing the other of the side edges of the second side surface film 12 and the other of the side edges of the folded second gusset film 14, and welding them by heat sealing is formed. A bottom heat-sealed part HSB formed by superimposing respective side edges of the first side surface film 11 and the second side surface film 12, and welding them by heat sealing is formed, and respective side edges of the first side surface film 11 and the second side surface film 12, which are positioned to face the bottom heat-sealed part HSB, form an opening 15 of the package 10 for transporting of a silicon material without being heat-sealed.

Figure 8:
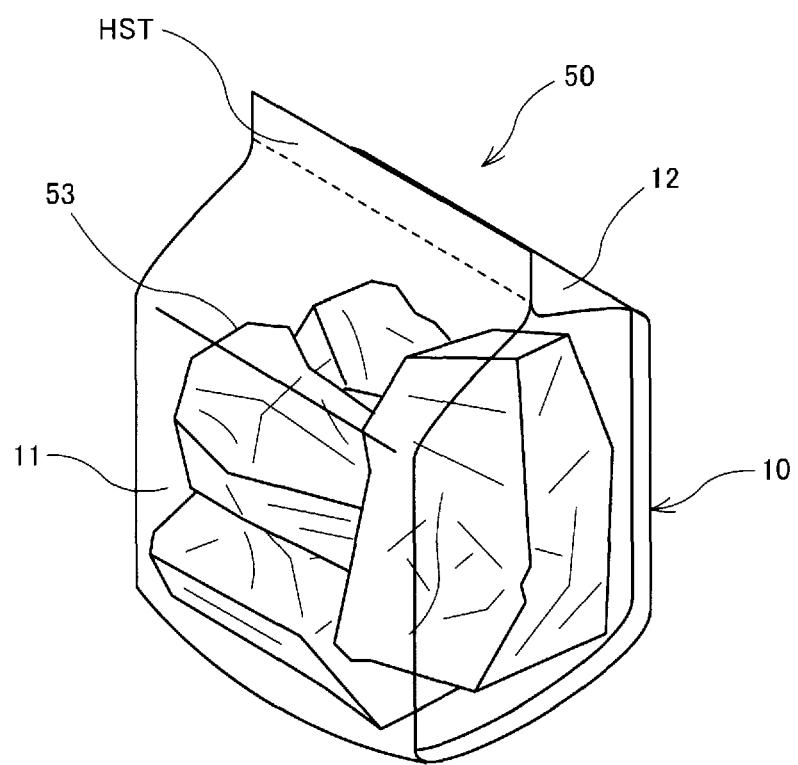
FIG. 8 is a perspective view showing a schematic configuration of a package of a silicon material according to one embodiment of the present disclosure.

When a large number of packages for transporting 10 of a silicon material in which the first gusset film 13 and the second gusset film 14 are folded are stacked, if the first side surface film 11 or the second side surface film 12 is sucked and held, and lifted upward, the opening 15 can be opened. From the opening 15 that is opened, the resin case 51 (refer to FIG. 7) for storing a silicon material (silicon wafer) 52 or a silicon material (polysilicon) 53 (refer to FIG. 8) is accommodated in the package 10 for transporting of a silicon material, respective side edges of the first side surface film 11 and the second side surface film 12 at the opening 15 are superimposed and heat-sealed, and thus the top heat-sealed part HST can be formed to prepare a package 50 of a silicon material (refer to FIG. 7 and FIG. 8).

Generally, the sealant is positioned on the innermost layer of the package for packaging the silicon material, but if volatile components derived from the sealant (outgas components derived from the sealant) adhere to the silicon material such as polysilicon or a silicon wafer, there is a risk of defects occurring in a semiconductor device produced using the silicon material. Therefore, it is desirable that the amount of the volatile components from the sealant be small. As one method of reducing the amount of the volatile components from the sealant, making the sealant thin may be exemplified. When the sealant is thinned, in consideration of the resistance to bending and the like, it is preferable to use linear low density polyethylene (LLDPE) as a constituent material of the sealant. However, in linear low density polyethylene (LLDPE), since the pressure during polymerization is low, low-molecular-weight components are likely to be generated, and there is a risk of volatile components being easily generated from the sealant. In addition, since the sealing temperature of linear low density polyethylene (LLDPE) is relatively high, there is a risk of the sealing strength being unlikely to be obtained.

In the package 10 for transporting of a silicon material in the present embodiment, low density polyethylene (LDPE) is contained on the side of the first surface 2A of the sealant 1 positioned on the innermost layer, and linear low density polyethylene (LLDPE) is contained on the side of the second surface 2B. According to linear low density polyethylene (LLDPE) constituting the sealant 1, the thickness T2 of the sealant 1 can be made relatively thin, and the followability can be improved, and according to low density polyethylene (LDPE) contained in the side of the first surface 2A of the sealant 1, it is possible to prevent low-molecular-weight components from volatilizing from linear low density polyethylene (LLDPE). Here, when a metal vapor deposition film or a metal foil is provided on the other side of the base 4 of the packaging material 3 constituting the package 10 for transporting of a silicon material, predetermined transparency is not secured, but when a metal vapor deposition film or a metal foil is provided on the other side of the base 4 of the packaging material 3, a gas barrier property and a light shielding property can be imparted to the package 10 for transporting of a silicon material. In addition, when predetermined transparency is secured in the sealant 1 provided on one side of the base 4, it is possible to easily check whether a foreign substance is adhered to the first surface 2A of the sealant 1 in the package 10 for transporting of a silicon material.

Figure 10:
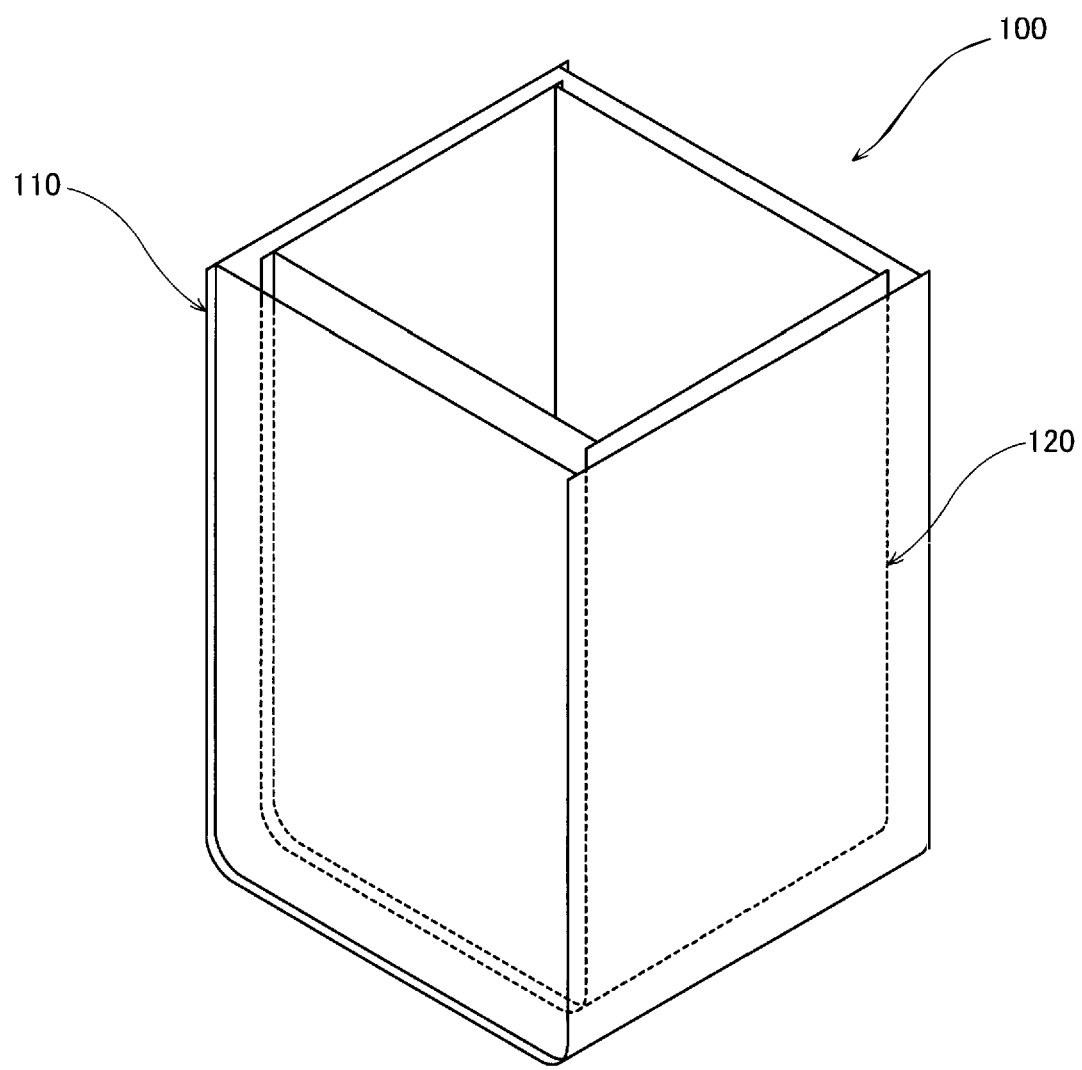
FIG. 10 is a perspective view showing a schematic configuration of one form of a bag for transporting of a silicon material according to one embodiment of the present disclosure.
Figure 11:
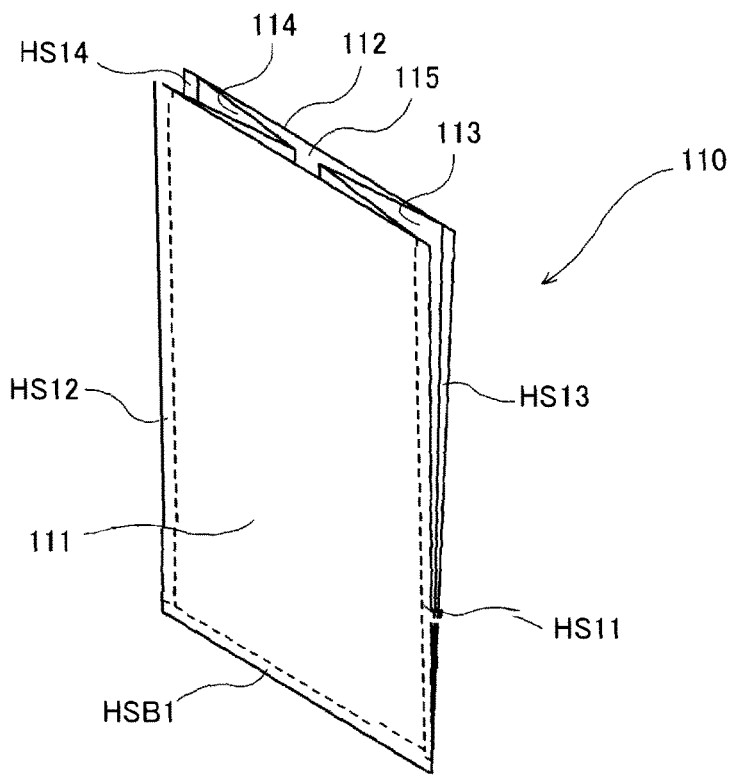
FIG. 11 is a perspective view showing a schematic configuration of one form of a first bag according to one embodiment of the present disclosure.
Figure 12:
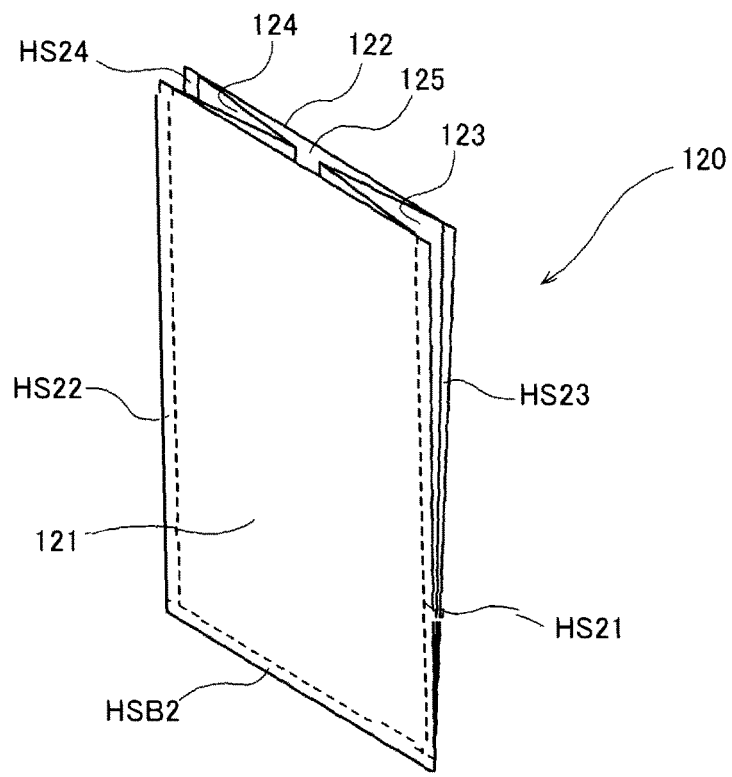
FIG. 12 is a perspective view showing a schematic configuration of one form of a second bag according to one embodiment of the present disclosure.

As shown in FIG. 10 to FIG. 12, a bag 100 for transporting of a silicon material according to the present embodiment is a double packaging bag including a first bag 110 and a second bag 120 arranged in the first bag 110. The first bag 110 is a so-called outer bag, and the second bag 120 is a so-called inner bag. The second bag 120, which is an inner bag, is independent of the first bag 110, which is an outer bag, and is arranged in the first bag 110 without being fixed to the first bag 110.

The first bag 110 and the second bag 120 are both packaging bags that become substantially rectangular (substantially rectangular parallelepiped) when they are unfolded, and are composed of first side surface films 111 and 121, second side surface films 112 and 122, first gusset films 113 and 123, and second gusset films 114 and 124. The first side surface film 111, the second side surface film 112, the first gusset film 113 and the second gusset film 114 are all composed of a first packaging material 130 (refer to FIG. 13). The first side surface film 121, the second side surface film 122, the first gusset film 123 and the second gusset film 124 are all composed of a second packaging material 140 (refer to FIG. 14 to FIG. 17). The outer diameter size of the second bag 120 may be any size as long as the second bag 120 can be arranged in the first bag 110. That is, the first bag 110 is slightly larger than the second bag 120. Here, neither the first bag 110 nor the second bag 120 may have the first gusset films 113 and 123 and the second gusset films 114 and 124. In this case, the first side surface films 111 and 121, and the second side surface films 112 and 122 may be heat-sealed at three side edges so that first surfaces 132A and 142A of sealant layers 132 and 142 face each other.

Figure 13:
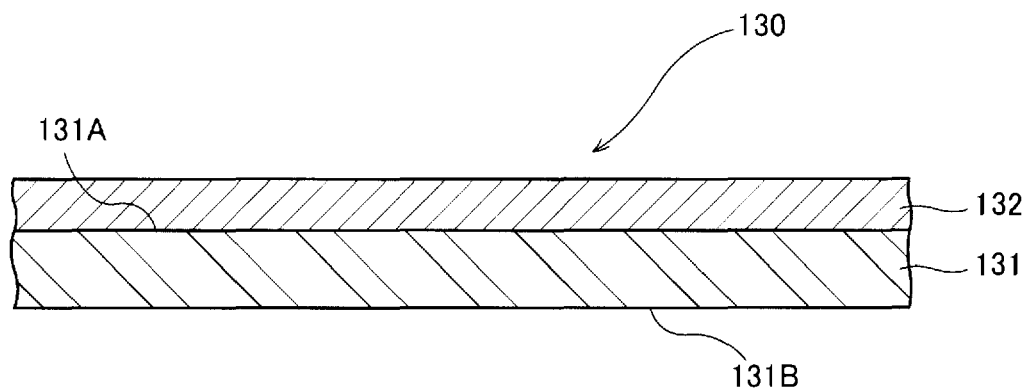
FIG. 13 is a partially enlarged cut end view showing a schematic configuration of one form of a first packaging material according to one embodiment of the present disclosure.

The first packaging material 130 constituting each film (the first side surface film 111, the second side surface film 112, the first gusset film 113, and the second gusset film 114) of the first bag 110 has a resin base layer 131 having one surface 131A and the other surface 131B that faces the one surface 131A, and a sealant layer 132 laminated on the side of the one surface 131A of the resin base layer 131 (refer to FIG. 13). Here, the first packaging material 130 is not limited to a two-layer structure including the resin base layer 131 and the sealant layer 132. For example, another layer such as a resin layer and an adhesive layer may be provided between the resin base layer 131 and the sealant layer 132. Similarly, the other layer may be provided on the side opposite to the sealant layer 132 of the resin base layer 131, or the other layer may be provided on the side opposite to the resin base layer 131 of the sealant layer 132.

Figure 14:
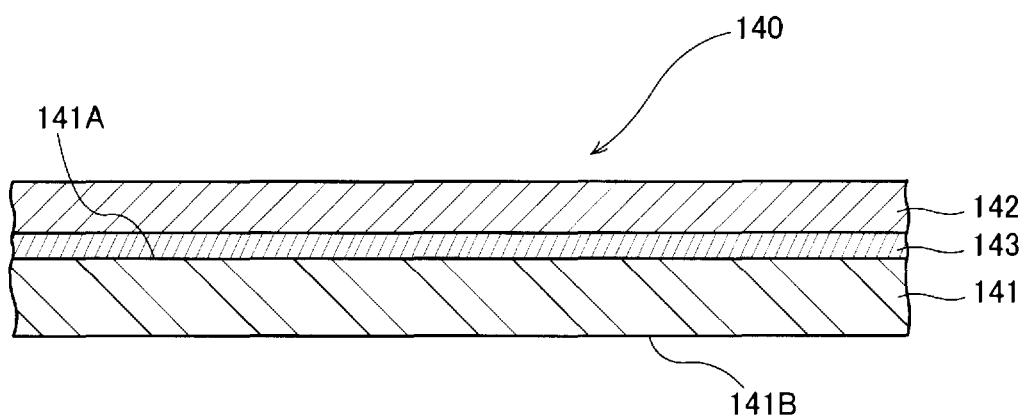
FIG. 14 is a partially enlarged cut end view showing a schematic configuration of one form of a second packaging material according to one embodiment of the present disclosure.
Figure 15:
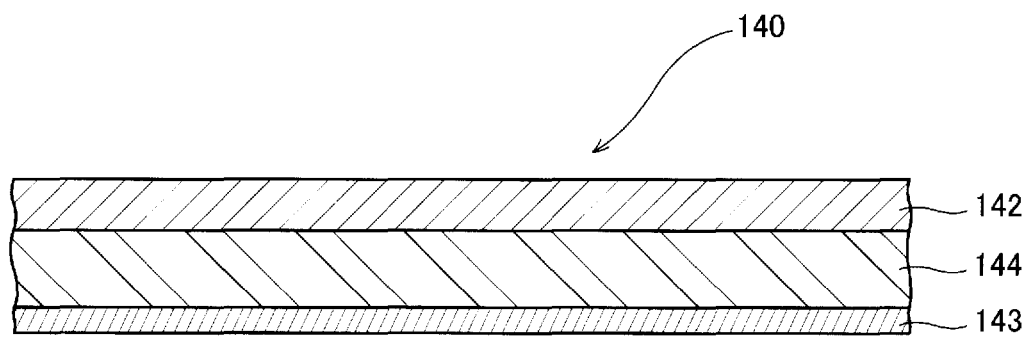
FIG. 15 is a partially enlarged cut end view showing a schematic configuration of another form of the second packaging material according to one embodiment of the present disclosure.

The second packaging material 140 constituting each film (the first side surface film 121, the second side surface film 122, the first gusset film 123, and the second gusset film 124) of the second bag 120 has a resin base layer 141 having one surface 141A and the other surface 141B that faces the one surface 141A, a barrier layer 143 laminated on the side of the one surface 141A of the resin base layer 141, and a sealant layer 142 laminated on the barrier layer 143 (refer to FIG. 14). In addition to the form shown in FIG. 14, the second packaging material 140 may be a material in which the barrier layer 143, a resin layer 144 containing polyethylene terephthalate (PET) or the like, and the sealant layer 142 are laminated in that order (refer to FIG. 15), a material in which the resin base layer 141, the barrier layer 143, the resin layer 144, and the sealant layer 142 are laminated in that order (refer to FIG. 16), or a material in which the resin base layer 141, an adhesive layer 145, the barrier layer 143, and the sealant layer 142 are laminated in that order (refer to FIG. 17). Here, like the first packaging material 130, the second packaging material 140 is not limited to the above layer structure, and another layer may be provided.

Examples of resin materials contained in the resin layer 144 include polyester-based resin materials such as polyethylene (PE), polyethylene terephthalate (PET), and polybutylene terephthalate (PBT). In the form shown in FIG. 16, the resin base layer 141 and the resin layer 144 may contain the same material or different materials, and preferably contain the same material. Thereby, a stress difference is less likely to occur on both sides of the barrier layer 143, and it is possible to prevent cracks from occurring in the barrier layer 143.

Figure 16:
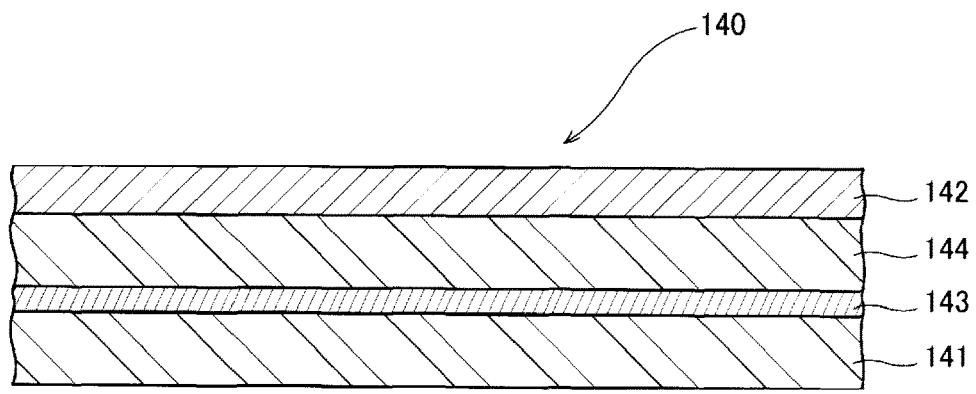
FIG. 16 is a partially enlarged cut end view showing a schematic configuration of another form of the second packaging material according to one embodiment of the present disclosure.
Figure 17:
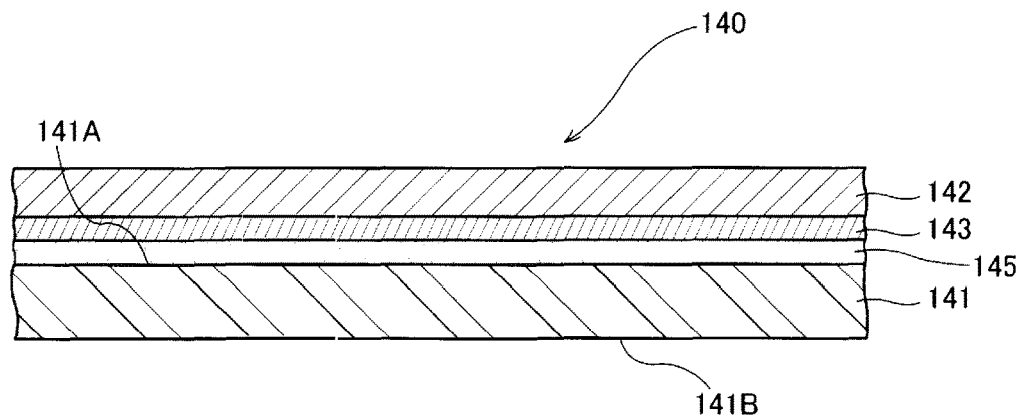
FIG. 17 is a partially enlarged cut end view showing a schematic configuration of another form of the second packaging material according to one embodiment of the present disclosure.

In FIG. 16, one resin layer 144 may be provided between the sealant layer 142 and the barrier layer 143, or a plurality of resin layers 144 may be provided. In addition, when a plurality of resin layers 144 are provided, the plurality of resin layers 144 may contain the same material or different materials. For example, although not shown, when a resin base layer, a barrier layer, a first resin layer, a second resin layer, and a sealant layer are laminated in that order, the first resin layer may contain polyethylene terephthalate (PET), and the second resin layer may contain polyethylene (PE).

The adhesive layer 145 can be formed using an adhesive. Examples of adhesives include a two-component urethane resin adhesive. More specifically, a two-component urethane resin adhesive in which a main agent (Ru77t commercially available from Rock Paint Co., Ltd.) and a curing agent (H-7 commercially available from Rock Paint Co., Ltd.) are mixed may be exemplified. The adhesive layer 145 may be arranged inside or outside the barrier layer 143, but is more preferably arranged outside the barrier layer 143. When a bag is prepared using the second packaging material 140, since the adhesive layer 145 is arranged further outside the bag than the barrier layer 143, it is possible to prevent an organic component from the adhesive layer 145 from moving to the inside of the bag. Thereby, when a silicon material is accommodated in the bag, it is possible to prevent the silicon material in the bag from deteriorating. The thickness of the adhesive layer 145 may be, for example, about 1 μm to 5 μm, and is preferably about 2 μm to 4 μm. When the thickness of the adhesive layer 145 is thinner than 1 μm, there is a risk of sufficient adhesive strength not being obtained. On the other hand, when the thickness of the adhesive layer 145 is thicker than 5 μm, it takes time to perform a curing reaction, and thus there is a risk of a large amount of unreacted materials, the residual solvent, and the like being contained in the adhesive layer 145.

Here, "further inside than the barrier layer" means that it is positioned further inside the second bag 120 than the barrier layer 143 of the second packaging material 140 when the second bag 120 is prepared using the second packaging material 140. On the other hand, "further outside than the barrier layer" means that it is positioned further outside of the second bag 120 than the barrier layer 143 of the second packaging material 140 when the second bag 120 is prepared using the second packaging material 140.

The resin base layer 131 of the first packaging material 130 may be composed of, for example, a polyester-based resin material such as polyethylene terephthalate (PET) and polybutylene terephthalate (PBT), and may be a single layer of one type of resin material or a laminate of two or more types of resin materials. The resin base layer 131 may contain a polyamide-based resin material such as nylon (Ny, registered trademark), and preferably does not contain the polyamide-based resin material. When the resin base layer 131 does not contain a polyamide-based resin material, it is possible to reduce a possibility of the contained silicon material being contaminated when the first bag 110 is opened. Here, for example, a layer of such as polyethylene (PE) may be provided between the resin base layer 131 and the sealant layer 132.

The resin base layer 141 of the second packaging material 140 is composed of, for example, one type of resin material selected from among a polyester-based resin material such as polyethylene (PE), polyethylene terephthalate (PET), and polybutylene terephthalate (PBT), a polyamide-based resin material such as nylon (registered trademark, Ny), and the like, or a laminate of two or more types of the resin materials. It is preferable that the resin base layer 141 do not contain a polyamide-based resin material such as nylon (Ny, registered trademark). There is a risk of caprolactam, which is the residual monomer of the polyamide-based resin material, contaminating the contained silicon material, but when the second bag 120 has the barrier layer 143 positioned inside the resin base layer 141, it is possible to prevent contamination due to the caprolactam. In this regard, if the resin base layer 141 contains a polyamide-based resin material, when the second bag 120 is opened, it cannot be denied that the silicon material may be contaminated due to caprolactam that may be contained in the resin base layer 141, but when the resin base layer 141 does not contain a polyamide-based resin material, it is possible to further reduce a possibility of the contained silicon material being contaminated.

In addition, generally, when a package in which a silicon material is packed in a double-packed bag including an outer bag and an inner bag is impacted during transportation, and the outer bag is damaged, since the inner bag does not have a barrier layer, there is a risk of the contained silicon material being contaminated. According to the present embodiment, when the second bag 120, which is the inner bag, has the barrier layer 143 positioned inside the resin base layer 141, it is possible to prevent the silicon material from being contaminated, even if the first bag, which is the outer bag, is damaged.

The thicknesses of the resin base layer 131 of the first packaging material 130 and the resin base layer 141 of the second packaging material 140 may be, for example, 8 μm to 30 μm, and are preferably 10 μm to 27 μm. When the thickness is less than 8 μm, it is difficult to maintain the bag shape of the first bag 110 and the second bag 120, there is a risk of deterioration of workability when a silicon material is accommodated in the bag 100 for transporting of a silicon material, and when the thickness exceeds 30 μm, the first bag 110 and the second bag 120 are less likely to be deformed, and when a silicon material is accommodated in the bag 100 for transporting of a silicon material, degassed and packed, there is a risk of followability of the first bag 110 and the second bag 120 decreasing.

Examples of layer structures of the second packaging material 140 may include the following specific examples. [Specific Examples of Layer Structure of Resin Base Layer 141/Adhesive Layer/Barrier Layer 143/Resin Layer 144/ Resin Layer/Sealant Layer 142]

PET/adhesive layer/AlO$_X$/PET/PE/sealant layer
PET/adhesive layer/SiO$_X$/PET/PE/sealant layer
nylon/adhesive layer/AlO$_X$/PET/PE/sealant layer
nylon/adhesive layer/SiO$_X$/PET/PE/sealant layer
nylon/adhesive layer/AlO$_X$/nylon/PE/sealant layer
nylon/adhesive layer/SiO$_X$/nylon/PE/sealant layer

[Specific Examples of Layer Structure of Resin Base Layer 141/Barrier Layer 143/Adhesive Layer/Resin Layer 144/ Resin Layer/Sealant Layer 142]

PET/AlO$_X$/adhesive layer/PET/PE/sealant layer
PET/SiO$_X$/adhesive layer/PET/PE/sealant layer
nylon/AlO$_X$/adhesive layer/PET/PE/sealant layer
nylon/SiO$_X$/adhesive layer/PET/PE/sealant layer Here, in the specific examples of the layer structure, as the "sealant layer," the above sample 1, sample 2 and sample 3 and the like may be exemplified. In the specific examples of the layer structure, "AlO$_X$" indicates a vapor deposition film of alumina, and "SiO$_X$" indicates a vapor deposition film of silica. In the specific examples of the layer structure, "PET" indicates a polyethylene terephthalate layer, "nylon" indicates a nylon layer, and "PE" indicates a polyethylene layer.

The sealant layer 132 of the first packaging material 130 has a first surface 132A and a second surface 132B that faces the first surface 132A. In the first packaging material 130, the second surface 132B of the sealant layer 132 is positioned on the side of the resin base layer 131. The sealant layer 132 may be a laminated structure having a first surface layer 321 positioned on the side of the first surface 132A, a second surface layer 322 positioned on the side of the second surface 132B, and an intermediate layer 323 interposed between the first surface layer 321 and the second surface layer 322 (refer to FIG. 18), or may be a single-layer structure having the first surface 132A and the second surface 132B (refer to FIG. 19).

The sealant layer 132 may contain a heat-fusible resin component, and may contain, for example, a polyolefin, a cyclic polyolefin, a carboxylic acid-modified polyolefin, a carboxylic acid-modified cyclic polyolefin, or the like.

Examples of polyolefins include polyethylene such as low density polyethylene (LDPE), medium density polyethylene, high density polyethylene, and linear low density polyethylene (LLDPE); polypropylenes such as homopolypropylene, a polypropylene block copolymer (for example, a block copolymer containing propylene and ethylene), and a random copolymer of polypropylene (for example, a random copolymer containing propylene and ethylene); terpolymers of ethylene-butene-propylene; and the like.

The cyclic polyolefin is a copolymer containing an olefin and a cyclic monomer, and examples of an olefin, which is a constituent monomer of a cyclic polyolefin, include ethylene, propylene, 4-methyl-1-pentene, styrene, butadiene, and isoprene. In addition, examples of a cyclic monomer, which is a constituent monomer of a cyclic polyolefin, include cyclic alkenes such as norbornene; and specifically, cyclic dienes such as cyclopentadiene, dicyclopentadiene, cyclohexadiene, and norbornadiene.

The carboxylic acid-modified polyolefin is a polymer modified by block-polymerizing or graft-polymerizing a polyolefin with a carboxylic acid. Examples of carboxylic acids used for modification include maleic acid, acrylic acid, itaconic acid, crotonic acid, maleic anhydride, and itaconic anhydride.

The carboxylic acid-modified cyclic polyolefin is a polymer obtained by copolymerizing some monomers constituting a cyclic polyolefin in place of $\alpha$, $\beta$-unsaturated carboxylic acid or its anhydride, or obtained by block-polymerizing or graft-polymerizing $\alpha$, $\beta$-unsaturated carboxylic acid or its anhydride with a cyclic polyolefin.

Figure 22:
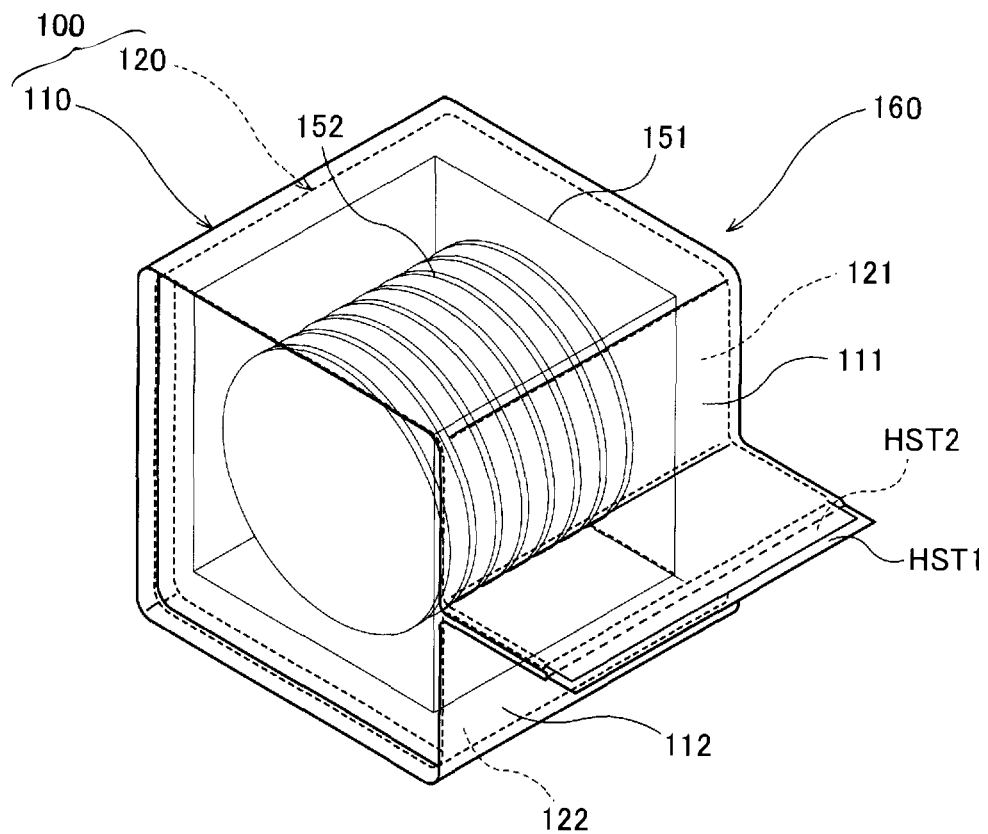
FIG. 22 is a perspective view showing a schematic configuration of one form of a package of a silicon material according to one embodiment of the present disclosure.

As will be described below, since the sealant layer 142 of the second packaging material 140 constituting the second bag 120 may contain a polyethylene such as low density polyethylene (LDPE) and linear low density polyethylene (LLDPE), the sealant layer 132 of the first packaging material 130 constituting the first bag 110 also preferably contains a polyethylene such as low density polyethylene (LDPE) and linear low density polyethylene (LLDPE). Here, the sealant layer 132 of the first packaging material 130 may be a layer not containing polyethylene such as low density polyethylene (LDPE) or linear low density polyethylene (LLDPE) as long as it has substantially the same sealing temperature as polyethylene such as low density polyethylene (LDPE) or linear low density polyethylene (LLDPE) constituting the sealant layer 142 of the second packaging material 140, and has the same sealing characteristics such as obtaining a desired sealing strength. If the sealant layer 132 of the first packaging material 130 and the sealant layer 142 of the second packaging material 140 have different sealing characteristics (for example, sealing temperature conditions), there is a risk of process defects when a silicon material is accommodated in the bag 100 for transporting of a silicon material to prepare a package 160 of a silicon material (refer to FIG. 22).

The first surface layer 321 positioned on the side of the first surface 132A of the sealant layer 132 may be a layer containing low density polyethylene (LDPE) to which substantially no slip agent is added, the second surface layer 322 positioned on the side of the second surface 132B may be, for example, a layer containing low density polyethylene (LDPE) to which substantially no slip agent is added, like the first surface layer 321, and the intermediate layer 323 interposed between the first surface layer 321 and the second surface layer 322 may be, for example, a layer containing linear low density polyethylene (LLDPE) to which substantially no slip agent is added. Here, in the present embodiment, "substantially no slip agent is added" means that the amount of an added component that actually improves the slipperiness of a surface of a sealant as a slip agent does not exceed an amount that actually affects the slipperiness of the surface of the sealant for the purpose of actually affecting the slipperiness of the surface of the sealant. Examples of slip agents include particles such as calcium carbonate and talc, and surfactants such as a silicone resin and a quaternary ammonium salt compound.

Like the sealant layer 132 of the first packaging material 130, the sealant layer 142 of the second packaging material 140 has a first surface 142A and a second surface 142B that faces the first surface 142A. In the second packaging material 140, the second surface 142B of the sealant layer 142 is positioned on the side of the resin base layer 141. The sealant layer 142 may be a laminated structure having a first surface layer 421 positioned on the side of the first surface 142A, a second surface layer 422 positioned on the side of the second surface 142B, and an intermediate layer 423 interposed between the first surface layer 421 and the second surface layer 422 (refer to FIG. 20), or may be a single-layer structure having the first surface 142A and the second surface 142B (refer to FIG. 21).

The sealant layer 142 may contain polyethylene such as low density polyethylene (LDPE) and linear low density polyethylene (LLDPE), and preferably contains low density polyethylene to which substantially no slip agent is added (LDPE), linear low density polyethylene to which substantially no slip agent is added (LLDPE) or the like.

Since the sealant layer 142 is positioned on the innermost layer of the second bag 120, if volatile components derived from the sealant layer 142 (outgas components derived from the sealant layer 142 and the like) adhere to a contained polysilicon or silicon wafer, there is a risk of defects occurring in a semiconductor device produced using the silicon wafer. Therefore, it is desirable that the amount of the volatile components derived from the sealant layer 142 be as small as possible. In order to reduce the amount of the volatile components derived from the sealant layer 142, it is desirable that the thickness T142 of the sealant layer 142 be as thin as possible. When the thickness T142 of the sealant layer 142 is made relatively thin, since the volatile components derived from the sealant layer 142 are released to the outside of the film, it is possible to reduce the amount of the volatile components derived from the sealant layer 142. On the other hand, when the thickness T142 of the sealant layer 142 is too thin, the resistance with respect to mechanical properties such as tensile strength may deteriorate, and there is a risk of a function of a bag for packing the contents deteriorating. In this regard, since linear low density polyethylene (LLDPE) has higher elasticity and higher resistance to bending than low density polyethylene (LDPE), if linear low density polyethylene (LLDPE) is used as the sealant layer 142, the thickness T142 of the sealant layer 142 can be made relatively thin.

Figure 23:
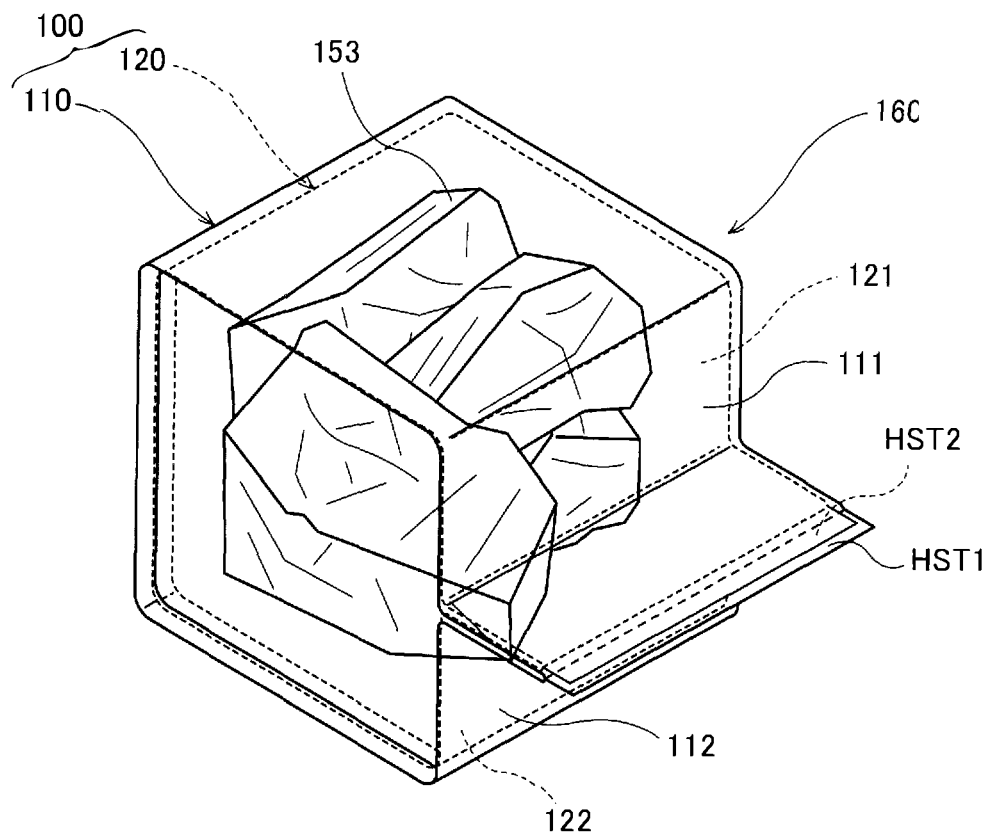
FIG. 23 is a perspective view showing a schematic configuration of one form of the package of a silicon material according to one embodiment of the present disclosure.

In addition, after a resin case 151 (refer to FIG. 22) or a polysilicon 153 (refer to FIG. 23) is accommodated in the second bag 120, since degassing is performed from the second bag 120 and packing is then performed, the sealant layer 142 contained in the second packaging material 140 constituting the second bag 120 is required to have improved followability. In this regard, since linear low density polyethylene (LLDPE) has relatively high elasticity, if the linear low density polyethylene (LLDPE) is used, the followability of the sealant layer 142 can be improved.

It is thought that, if the sealant layer is composed of a single layer of linear low density polyethylene (LLDPE), since the indentation elastic modulus of the sealant layer composed of a single layer of linear low density polyethylene (LLDPE) can be adjusted to about 150 MPa to 600 MPa, the thickness of the sealant layer can be thinned. In addition, it can be said that it is preferable that the sealant layer be composed of a single layer of linear low density polyethylene (LLDPE) in consideration of improving the followability of the sealant layer. However, since the pressure during polymerization of linear low density polyethylene (LLDPE) is lower than the pressure during polymerization of low density polyethylene (LDPE), low-molecular-weight components are more likely to volatilize in linear low density polyethylene (LLDPE) than in low density polyethylene (LDPE). Therefore, it is thought that, if the sealant layer is composed of a single layer of linear low density polyethylene (LLDPE), even if the thickness of the sealant layer can be thinned, there is a risk of volatile components derived from the sealant layer contaminating the silicon material. In addition, it is thought that, since linear low density polyethylene (LLDPE) tends to be less slippery than low density polyethylene (LDPE), if the sealant layer is composed of a single layer of linear low density polyethylene (LLDPE), there is a risk of the slipperiness of the surface of the sealant layer being reduced. Since it is preferable that the sealant layer 142 used in the second bag 120 be substantially free of a slip agent that may become a foreign substance, it is preferable to improve the slipperiness by a method other than use of the slip agent. In the present embodiment, the intermediate layer 423 containing linear low density polyethylene (LLDPE) may be interposed between the first surface layer 421 and the second surface layer 422 which contain low density polyethylene (LDPE). Therefore, in the sealant layer 142 of the second bag 120, the thickness T142 can be made relatively thin, the followability and slipperiness are improved, and it is possible to prevent low-molecular-weight components from volatilizing from linear low density polyethylene (LLDPE) contained in the intermediate layer 423.

Figure 19:
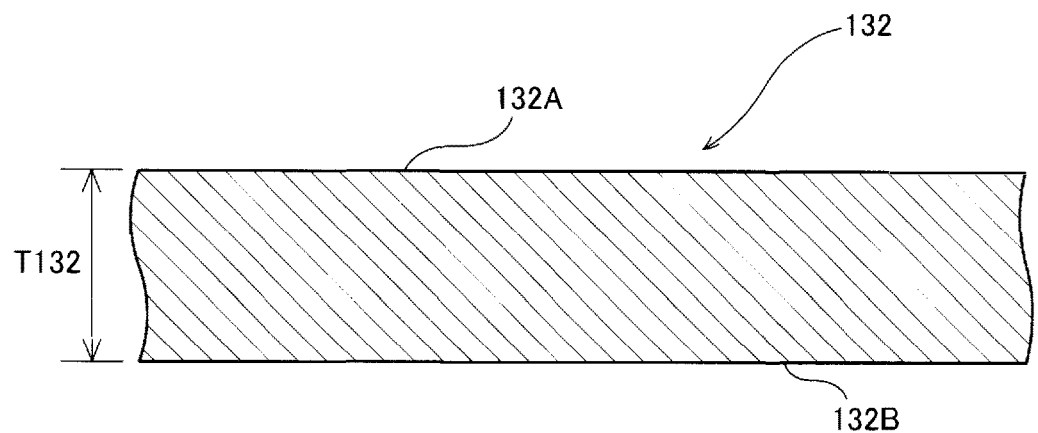
FIG. 19 is a partially enlarged cut end view showing a schematic configuration of another form of the sealant layer of the first packaging material according to one embodiment of the present disclosure.
Figure 21:
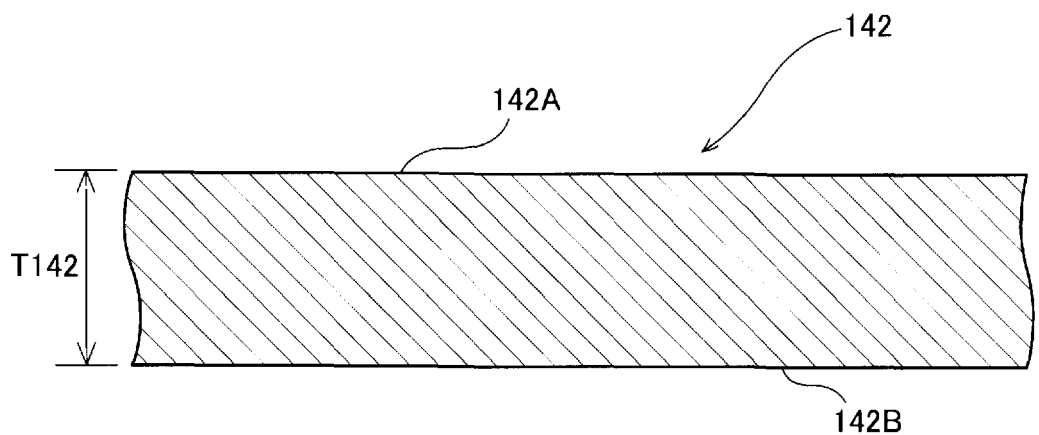
FIG. 21 is a partially enlarged cut end view showing a schematic configuration of another form of the sealant layer of the second packaging material according to one embodiment of the present disclosure.

The sealant layers 132 and 142 having a single-layer structure shown in FIG. 19 and FIG. 21 may contain low density polyethylene (LDPE) and linear low density polyethylene (LLDPE). In the sealant layers 132 and 142, the mixing ratio of low density polyethylene (LDPE) and linear low density polyethylene (LLDPE) may be about 50:50 to 70:30. In this manner, when the amount of low density polyethylene (LDPE) added is equal to or larger than the amount of linear low density polyethylene (LLDPE) added, the abundance of low density polyethylene (LDPE) on the side of the first surfaces 132A and 142A of the sealant layers 132 and 142 can increase, and an effect of thinning the thicknesses T132 and T142 of the sealant layers 132 and 142 due to linear low density polyethylene (LLDPE), that is, an effect of preventing low-molecular-weight components from volatilizing, is achieved. Here, when viewed in a thickness direction of the sealant layers 132 and 142, low density polyethylene (LDPE) and linear low density polyethylene (LLDPE) may be substantially uniformly provided, and low density polyethylene (LDPE) may be unevenly distributed on the side of the first surfaces 132A and 142A and on the side of the second surfaces 132B and 142B.

The thicknesses T132 and T142 of the sealant layers 132 and 142 can be appropriately set according to the thickness of the first bag 110 composed of the first packaging material 130, the thickness of the second bag 120 composed of the second packaging material 140, and the like, and may be, for example, about 35 µm to 100 µm.

Figure 18:
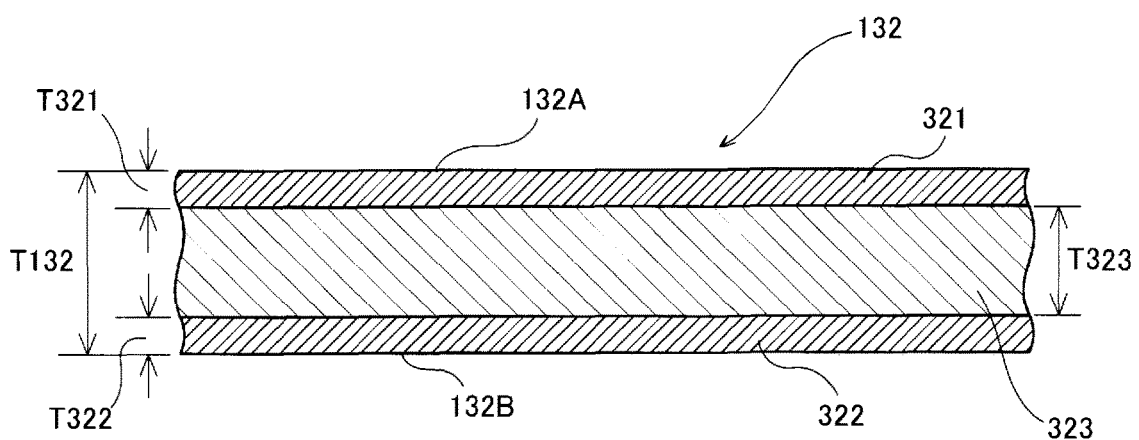
FIG. 18 is a partially enlarged cut end view showing a schematic configuration of one form of a sealant layer of a first packaging material according to one embodiment of the present disclosure.
Figure 20:
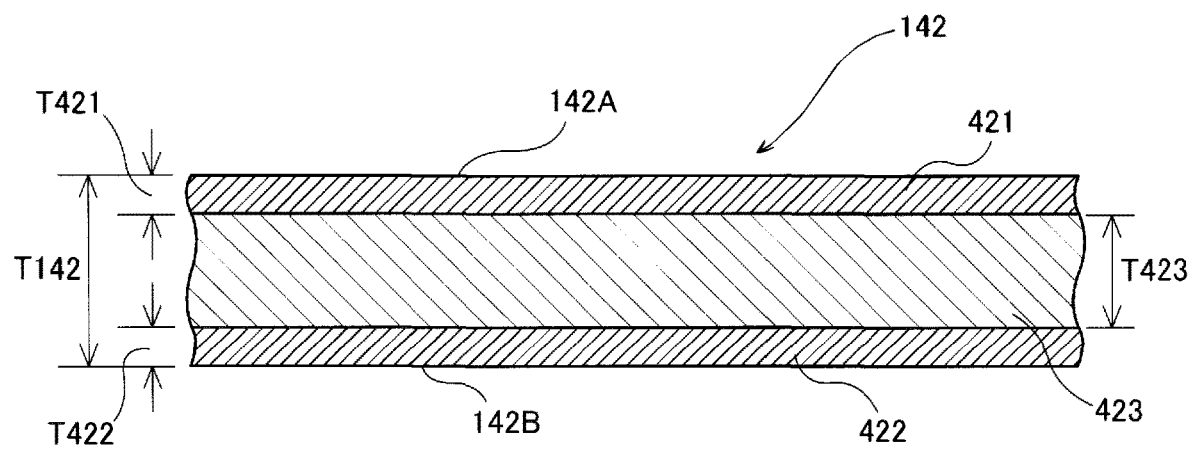
FIG. 20 is a partially enlarged cut end view showing a schematic configuration of one form of a sealant layer of the second packaging material according to one embodiment of the present disclosure.

In the forms shown in FIG. 18 and FIG. 20, when the first surface layers 321 and 421 containing low density polyethylene (LDPE) and the second surface layers 322 and 422 containing low density polyethylene (LDPE) are arranged with the intermediate layers 323 and 423 interposed therebetween, the internal stress on one side of the sealant layers 132 and 142 and the internal stress on the other side thereof cancel each other out to some extent, and curling of the sealant layers 132 and 142 can be minimized. In addition, in the forms shown in FIG. 18 and FIG. 20, the thicknesses T321, T322, T421 and T422 of the first surface layers 321 and 421 and the second surface layers 322 and 422 are all thinner than the thicknesses T323 and T423 of the intermediate layers 323 and 423. When the thicknesses T321, T322, T421, and T422 of the first surface layers 321 and 421 and the second surface layers 322 and 422 are thinner than the thicknesses T323 and T423 of the intermediate layers 323 and 423, predetermined followability can be imparted to the sealant layers 132 and 142. The ratio of the thicknesses T321 and T421 of the first surface layers 321 and 421 and the thicknesses T323 and T423 of the intermediate layers 323 and 423 may be about 1:1 to 10, and is preferably about 1:2 to 3. When the ratio of the thickness is within the above range, sufficient followability due to low density linear polyethylene (LLDPE) contained in the intermediate layers 323 and 423 can be imparted to the sealant layers 132 and 142, and the indentation elastic modulus of the sealant layers 132 and 142 can be within a range of 300 MPa to 500 MPa. Here, the indentation elastic modulus can be measured using a micro-hardness tester (product name "PICODENTOR HM500," commercially available from Fischer Instruments K.K.).

It is known that the sealing strength of the sealant can be controlled by the sealing temperature, the sealing pressure, the sealing time and the like during heat sealing. Generally, when the sealing temperature is higher, the sealing strength tends to be higher, but if the sealing temperature is too high, the sealant melts more than necessary, and there is a risk of the sealing strength being lowered. In the present embodiment, under heat sealing conditions of a sealing temperature of 150° C., a sealing pressure of 0.1 MPa, and a sealing time of 1 second, the sealing strength when the first surfaces 132A and 142A of the sealant layers 132 and 142 are sealed to each other may be 30 N/15 mm or more, and is preferably 50 N/15 mm or more and less than 60 N/15 mm. When the sealing strength is less than 30 N/15 mm, during transportation of the package 160 of the silicon material packaged in the bag 100 for transporting of a silicon material having the first and second bags 110 and 120 composed of the first and second packaging materials 130 and 140 having the sealant layers 132 and 142, there is a risk of a heat-sealed part (for example, top heat-sealed parts HST1 and HST2 (refer to FIG. 22 and FIG. 23)) of the bag 100 for transporting of the silicon material being peeled off.

As described above, it is thought that, in order to make the thickness T142 of the sealant layer 142 relatively thin, it is preferable to use linear low density polyethylene (LLDPE) as a constituent material of the sealant layer 142. However, in a sealant layer composed of linear low density polyethylene (LLDPE), the sealing temperature required to obtain a predetermined sealing strength becomes relatively high. In this regard, in the present embodiment, when the first surface layer 421 of the sealant layer 142 contains low density polyethylene (LDPE), the sealing temperature required to obtain a predetermined sealing strength can be relatively lowered.

The haze of the sealant layer 142 in the present embodiment may be 25% or less, and is preferably 20% or less. When the haze of the sealant layer 142 is 20% or less, the visibility inside the second bag 120 can be improved. In addition, before the silicon material is packaged in the package for transporting of a silicon material, it is possible to check whether a foreign substance is adhered to a first surface 142A of the sealant layer 142, and it is also possible to prevent contamination of the silicon material before it happens. Here, the haze of the sealant layer 142 can be measured according to JIS-K 7136 using, for example, a haze meter (product name: HM-150, commercially available from Murakami Color Research Laboratory Co., Ltd.).

The sealant layers 132 and 142 having the above configuration can be produced using a conventionally known film forming method. For example, the sealant layers 132 and 142 having the configuration shown in FIG. 18 and FIG. 20 can be produced by laminating the second surface layers 322 and 422, the intermediate layers 323 and 423, and the first surface layers 321 and 421 using a coating method such as a die coating method and an inflation method. Similarly, the sealant layers 132 and 142 having the configuration shown in FIG. 19 and FIG. 21 can be produced using the above coating method, extrusion inflation method, or the like.

The barrier layer 143 of the second packaging material 140 in the present embodiment may be, for example, a vapor deposition film formed by vapor-depositing an inorganic oxide such as silica or alumina on, for example, a PET layer. When the second packaging material 140 has the barrier layer 143, it is possible to prevent a gas or the like that contaminates the surface of the contained silicon material from entering from the outside of the second bag 120. The barrier layer 143 may be a metal vapor deposition film formed by vapor-depositing a metal such as aluminum on the resin base layer 141 or the resin layer 144, or a metal foil such as aluminum. When the barrier layer 143 is such a metal vapor deposition film or metal foil, transparency is not secured in the second bag 120, but not only a barrier property but also a light shielding property can be imparted to the second bag 120. In addition, in this form, when the sealant layer 142 has predetermined transparency, it is possible to more easily check whether a foreign substance is adhered to the first surface 142A of the sealant layer 142 in the second bag 120.

As described above, when the silicon material is packaged in the bag 100 for transporting of a silicon material (refer to FIG. 10), the sealant layers 132 and 142 have transparency to the extent that the inside of the bag 100 for transporting can be visually recognized. Therefore, in the first packaging material 130 and the second packaging material 140 having the sealant layers 132 and 142, similarly, it is desirable to have transparency to the extent that the inside of the bag 100 for transporting can be visually recognized. In such a point of view, the haze of the first packaging material 130 and the second packaging material 140 in the present embodiment may be, for example, 30% or less, and is preferably 25% or less. When the haze of the first packaging material 130 and the second packaging material 140 exceeds 30%, the visibility inside the bag 100 for transporting of a silicon material having the first bag 110 and the second bag 120 produced from the first packaging material 130 and the second packaging material 140 deteriorates, and there is a risk that it will be difficult to check whether a foreign substance is adhered to the first surfaces 132A and 142A of the sealant layers 132 and 142 in the bag 100 for transporting of a silicon material. Here, the haze of the first packaging material 130 and the second packaging material 140 can be measured according to JIS-K 7136 using, for example, a haze meter (product name: HM-150, commercially available from Murakami Color Research Laboratory Co., Ltd.).

The first bag 110 has a configuration in which the first surface 132A of each sealant layer 132 of the first side surface film 111, the second side surface film 112, the first gusset film 113 and the second gusset film 114 is positioned on the innermost surface, and the side of the other surface 131B of the resin base layer 131 is positioned on the outermost surface. The second bag 120 has a configuration in which the first surface 142A of each sealant layer 142 of the first side surface film 121, the second side surface film 122, the first gusset film 123 and the second gusset film 124 is positioned on the innermost surface, and the side of the other surface 141B (refer to FIG. 14 and FIG. 16) or the barrier layer 143 (refer to FIG. 15) of the resin base layer 141 is positioned on the outermost surface.

In each of the first bag 110 and the second bag 120, first heat-sealed parts HS11 and HS21 formed by superimposing one of two opposing side edges of the first side surface films 111 and 121 and one of two opposing side edges of the folded first gusset films 113 and 123 and welding them by heat sealing are formed, and second heat-sealed parts HS12 and HS22 formed by superimposing the other of the side edges of the first side surface films 111 and 121 and one of two opposing side edges of the folded second gusset films 114 and 124, and welding them by heat sealing are formed. In addition, third heat-sealed parts HS13 and HS23 formed by superimposing one of two opposing side edges of the second side surface films 112 and 122 and the other of the side edges of the folded first gusset films 113 and 123, and welding them by heat sealing are formed, and fourth heat-sealed parts HS14 and HS24 formed by superimposing the other of the side edges of the second side surface films 112 and 122 and the other of the side edges of the folded second gusset films 114 and 124, and welding them by heat sealing are formed. Bottom heat-sealed parts HSB1 and HSB2 formed by superimposing respective side edges of the first side surface films 111 and 121 and the second side surface films 112 and 122, and welding them by heat sealing are formed, and respective side edges of the first side surface films 111 and 121 and the second side surface films 112 and 122, which are positioned to face the bottom heat-sealed parts HSB1 and HSB2, form openings 115 and 125 of the first bag 110 and the second bag 120 without being heat-sealed.

When a large number of second bags 120 in which the first gusset film 123 and the second gusset film 124 are folded are stacked, if the first side surface film 121 or the second side surface film 122 is sucked and held and lifted upward, the opening 125 can be opened. From the opening 125 that is opened, the resin case 151 for storing a silicon material 152 (refer to FIG. 22) or the polysilicon 153 (refer to FIG. 23) is accommodated in the second bag 120, respective side edges of the first side surface film 121 and the second side surface film 122 at the opening 125 are superimposed and heat-sealed, and thus the top heat-sealed part HST2 is formed. Subsequently, when a large number of first bags 110 in which the first gusset film 113 and the second gusset film 114 are folded are stacked, if the first side surface film 111 or the second side surface film 112 is sucked and held, and lifted upward, the opening 115 can be opened. From the opening 115 that is opened, the resin case 151 or the polysilicon 153 is accommodated, and the second bag 120 in which the top heat-sealed part HST2 is formed is accommodated. Then, respective side edges of the first side surface film 111 and the second side surface film 112 at the opening 115 are superimposed and heat-sealed, and thus the top heat-sealed part HST1 is formed. In this manner, the package 160 of the silicon material can be prepared.

In the second bag 120 in the present embodiment, low density polyethylene (LDPE) is contained on the side of the first surface 142A of the sealant layer 142 positioned on the innermost layer, and linear low density polyethylene (LLDPE) is contained on the side of the second surface 142B. According to linear low density polyethylene (LLDPE) constituting the sealant layer 142, the thickness T142 of the sealant layer 142 can be made relatively thin, and the followability can be improved, and according to low density polyethylene (LDPE) contained on the side of the first surface 142A of the sealant layer 142, it is possible to prevent low-molecular-weight components from volatilizing from linear low density polyethylene (LLDPE). Here, when the barrier layer 143 of the second packaging material 140 constituting the second bag 120 is a metal vapor deposition film or a metal foil, predetermined transparency is not secured, but when the barrier layer 143 is a metal vapor deposition film or a metal foil, a barrier property and a light shielding property can be imparted to the second bag 120. In addition, when predetermined transparency is secured in the sealant layer 142, it is possible to easily check whether a foreign substance is adhered to the first surface 142A of the sealant layer 142 in the second bag 120.

Figure 24A:
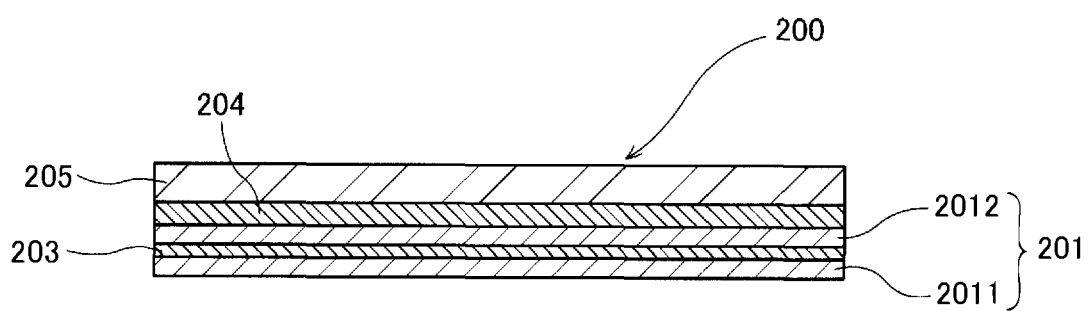
FIG. 24A is a partially enlarged cut end view showing a schematic configuration of one form of a packaging material according to one embodiment of the present disclosure.
Figure 28:
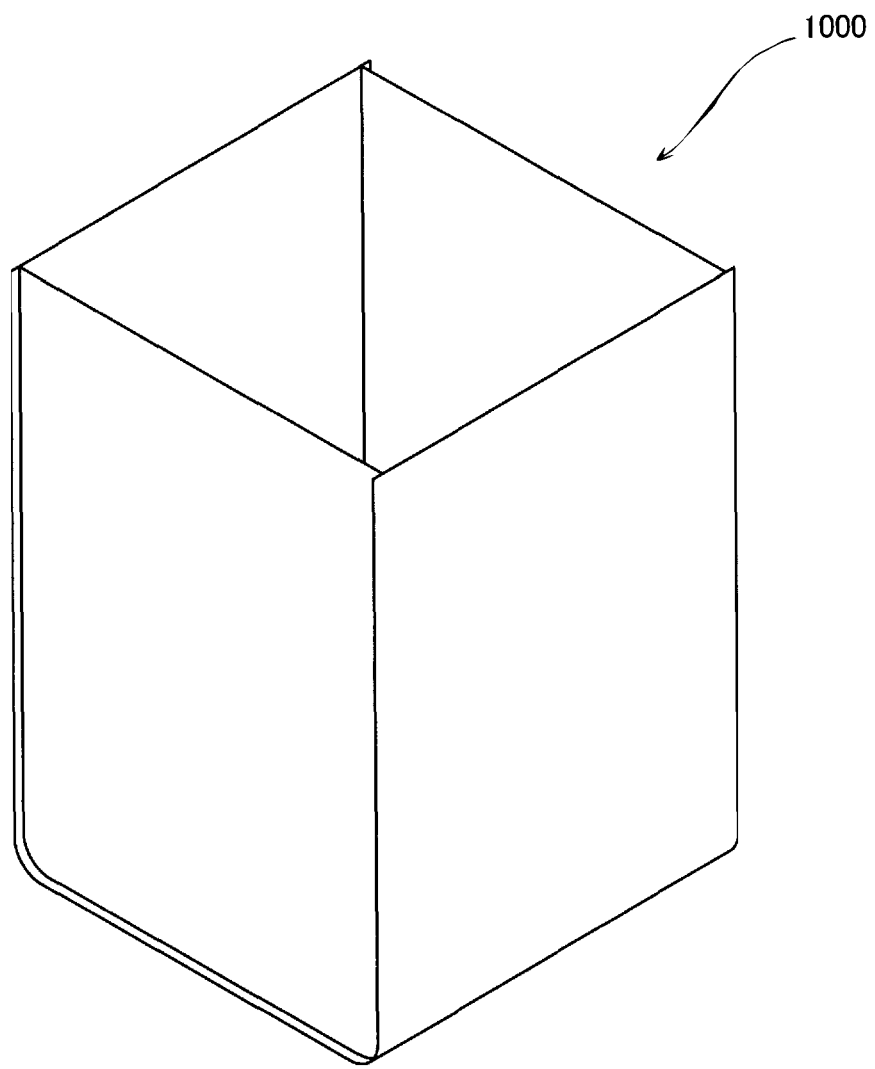
FIG. 28 is a perspective view showing a schematic configuration when a bag for transporting of a silicon material according to one embodiment of the present disclosure is unfolded.
Figure 29:
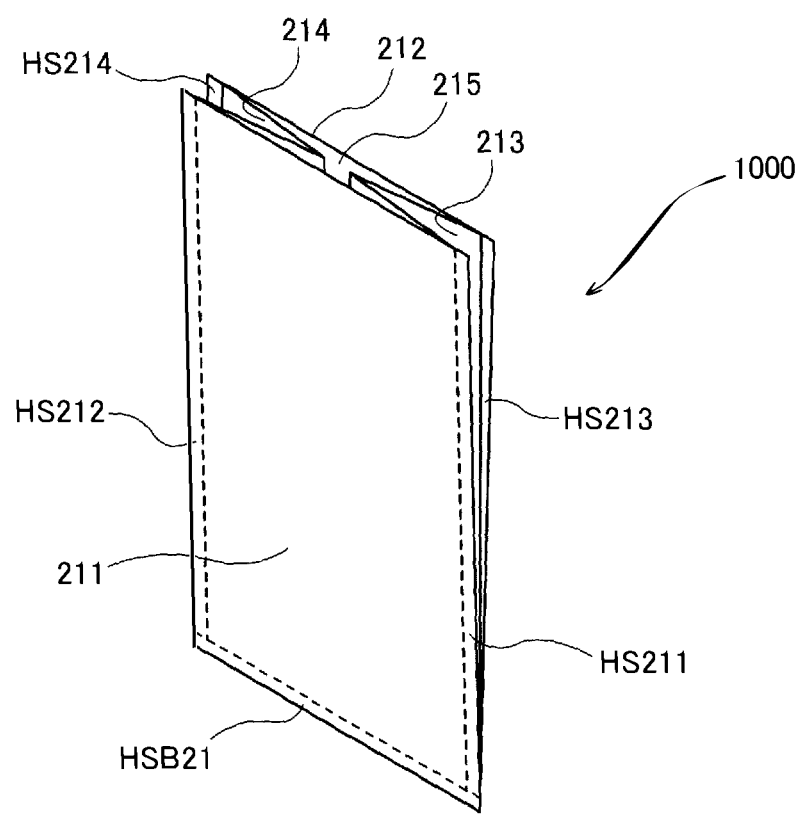
FIG. 29 is a perspective view showing a schematic configuration when a bag for transporting of a silicon material according to one embodiment of the present disclosure is closed.

As shown in FIG. 24A, a packaging material 200 according to the present embodiment is used for a bag 1000 for transporting of a silicon material (refer to FIG. 28 and FIG. 29), and is a laminate having a resin base layer 201 having a first resin base layer 2011 and a second resin base layer 2012, a barrier layer 203 positioned between the first resin base layer 2011 and the second resin base layer 2012, and a sealant layer 205 positioned on the side opposite to the barrier layer 203 in the second resin base layer 2012 with a resin layer 204 therebetween. In the bag 1000 for transporting of a silicon material composed of the packaging material 200, the sealant layer 205 is positioned inside and the first resin base layer 2011 is positioned outside.

The first resin base layer 2011 and the second resin base layer 2012 are both composed of, for example, a polyester-based resin material such as polyethylene terephthalate (PET) and polybutylene terephthalate (PBT), and may be a single layer of one type of resin material or a laminate of two or more types of resin materials.

Figure 30:
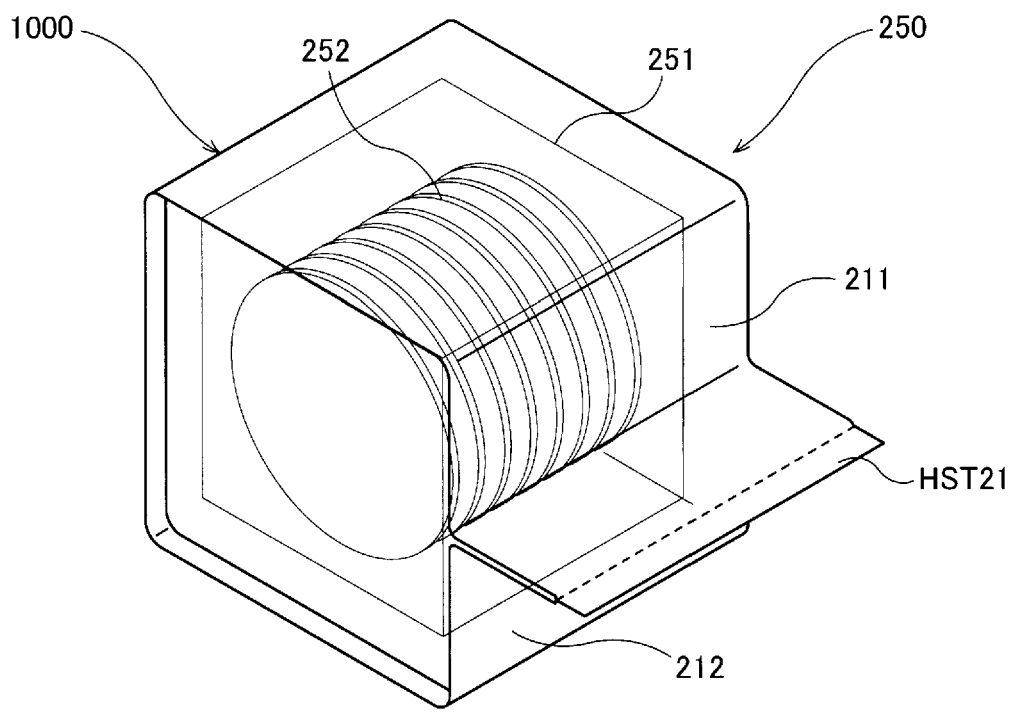
FIG. 30 is a perspective view showing a schematic configuration of a package of a silicon material according to one embodiment of the present disclosure.
Figure 31:
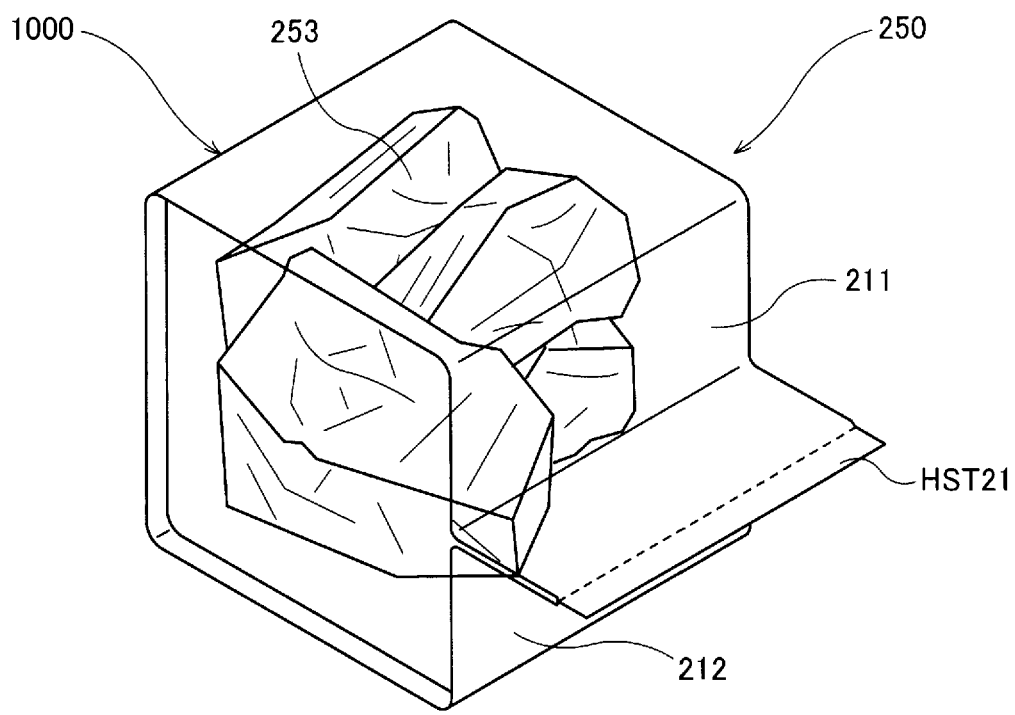
FIG. 31 is a perspective view showing a schematic configuration of a package of a silicon material according to one embodiment of the present disclosure.

The first resin base layer 2011 and the second resin base layer 2012 both may contain a polyamide-based resin material such as nylon (Ny, registered trademark), and it is preferable that at least the second resin base layer 2012 do not contain the polyamide-based resin material, and it is particularly preferable that both the first resin base layer 2011 and the second resin base layer 2012 do not contain the polyamide-based resin material. Caprolactam, which is the residual monomer of the polyamide-based resin material, can be a causative substance that contaminates the contained silicon material (a silicon wafer 252 and a polysilicon 253) of a package 250 (refer to FIG. 30 and FIG. 31), but when the bag 1000 for transporting has the barrier layer 203 positioned inside the first resin base layer 2011, it is possible to reduce a possibility of the silicon materials 252 and 253 being contaminated due to the caprolactam. In this regard, even if the second resin base layer 2012 does not contain a polyamide-based resin material, if the first resin base layer 2011 contains a polyamide-based resin material, when the bag 1000 for transporting is opened, it cannot be denied that the silicon materials 252 and 253 may be contaminated due to caprolactam that may be contained in the first resin base layer 2011, but when the first resin base layer 2011 does not contain a polyamide-based resin material, it is possible to further reduce a possibility of the contained silicon materials 252 and 253 being contaminated.

The resin material constituting the first resin base layer 2011 and the resin material constituting the second resin base layer 2012 may be the same resin material or different resin materials, and are preferably the same resin material. When the silicon materials 252 and 253 are packed in the bag 1000 for transporting of a silicon material composed of the packaging material 200 according to the present embodiment, the silicon materials 252 and 253 are accommodated in the bag 1000 for transporting, and the inside of the bag 1000 for transporting is then degassed and vacuum-packed.

In the vacuum-packed package 250, a predetermined stress is applied to the packaging material 200 constituting the bag 1000 for transporting. If a large difference occurs between distortion of the first resin base layer 2011 positioned on one side of the barrier layer 203 and distortion of the second resin base layer 2012 positioned on the other side thereof when stress is applied to the packaging material 200, the barrier layer 203 cannot follow this difference in distortion, and there is a risk of cracks occurring in the barrier layer 203. If cracks occur in the barrier layer 203, a barrier function of blocking permeation of oxygen, water vapor, and the like deteriorates, and there is a risk of the contained silicon materials 252 and 253 being contaminated. In the present embodiment, since the first resin base layer 2011 and the second resin base layer 2012 are positioned on both sides of the barrier layer 203, even if a predetermined stress is applied to the packaging material 200, it is difficult for a large distortion difference to occur between the first resin base layer 2011 and the second resin base layer 2012, and it is possible to prevent cracks from occurring in the barrier layer 203. In order to more effectively prevent the occurrence of cracks in the barrier layer 203, even if the resin material constituting the first resin base layer 2011 and the resin material constituting the second resin base layer 2012 are different from each other, it is preferable that the difference in indentation elastic modulus between the two resin materials be small, and it is particularly preferable that the two resin materials be the same. Here, when the two resin materials are different from each other, the difference in indentation elastic modulus between the two resin materials is preferably 1,000 MPa or less, and particularly preferably 800 MPa or less. When the main component (the resin material of which the amount contained is the most in terms of mass) of the resin material contained in the first resin base layer 2011 and the main component of the resin material contained in the second resin base layer 2012 are the same, it can be said that the resin materials constituting the first resin base layer 2011 and the second resin base layer 2012 are the same.

In addition, as in the present embodiment, when the resin base layer 201 (the first resin base layer 2011 and the second resin base layer 2012) is provided on both sides of the barrier layer 203, the strength of the packaging material 200 can be relatively improved. When the strength of the packaging material 200 is improved, the bag 1000 for transporting of a silicon material is less likely to be torn, and an effect of improving workability when the silicon materials 252 and 253 are packed in the bag 1000 for transporting of a silicon material can be achieved.

The indentation elastic modulus of the first resin base layer 2011 and the second resin base layer 2012 may be 1,500 MPa to 3,500 MPa, and is preferably 1,800 MPa to 3,300 MPa. Although it depends on the thickness of the packaging material 200, if the indentation elastic modulus is less than 1,500 MPa, the strength of the bag 1000 for transporting of a silicon material tends to be relatively lowered, and there is a high possibility of the bag 1000 for transporting being damaged, and if the indentation elastic modulus exceeds 3,500 MPa, the rigidity of the bag 1000 for transporting of a silicon material tends to be relatively large, and there is a high possibility of workability when the silicon material is packed in the bag 1000 for transporting being lowered.

The thicknesses of the first resin base layer 2011 and the second resin base layer 2012 may be, for example, 6 μm to 40 μm, and are preferably 10 μm to 30 μm. Although it depends on the indentation elastic modulus of the first resin base layer 2011 and the second resin base layer 2012, if the thickness is less than 6 µm, the strength of the bag 1000 for transporting of a silicon material tends to be relatively lowered, and there is a high possibility of the bag 1000 for transporting being damaged, and if the thickness exceeds 40 µm, the rigidity of the bag 1000 for transporting of a silicon material tends to be relatively large, and there is a high possibility of workability when the silicon material is packed in the bag 1000 for transporting being lowered. In this manner, in consideration of the strength of the bag 1000 for transporting of a silicon material and workability when the silicon material is packed in the bag 1000 for transporting, it is important to set the indentation elastic modulus and the thickness of the first resin base layer 2011 and the second resin base layer 2012 constituting the packaging material 200 to be within appropriate ranges. For example, when the indentation elastic modulus is relatively small, the thickness is made relatively thick, and when the indentation elastic modulus is relatively large, the thickness is made relatively thin, it is possible to improve the strength of the bag 1000 for transporting of a silicon material and the workability when the silicon material is packed in the bag 1000 for transporting. On the other hand, when the barrier layer 203 is interposed between the first resin base layer 2011 and the second resin base layer 2012, which have a predetermined rigidity and have a larger indentation elastic modulus than, for example, the sealant layer 205, it is possible to prevent the barrier layer 203 from being damaged. Therefore, in consideration of the strength of the bag 1000 for transporting of a silicon material, the workability when the silicon material is packed in the bag 1000 for transporting, and also the protectiveness of the barrier layer 203 and the like, it is preferable to set the indentation elastic modulus and the thickness of the first resin base layer 2011 and the second resin base layer 2012 to be within appropriate ranges.

The resin layer 204 may be provided between the first resin base layer 2011 and the sealant layer 205. The resin layer 204 can be provided between the first resin base layer 2011 and the barrier layer 203. In addition, the resin layer 204 can be provided between the barrier layer 203 and the second resin base layer 2012. In addition, the resin layer 204 can be provided between the second resin base layer 2012 and the sealant layer 205. Here, the plurality of resin layers 204 can be provided between the first resin base layer 2011 and the sealant layer 205. The plurality of resin layers 204 may be provided outside the barrier layer 203, or may be provided inside the barrier layer 203. In addition, at least one resin layer 204 may be provided outside and inside the barrier layer 203. The resin layer 204 may be formed of an extrusion laminate of polyolefin such as polyethylene (PE), or may be formed with an adhesive that adheres the second resin base layer 2012 and the sealant layer 205. Examples of adhesives include a two-component urethane resin adhesive. As the two-component urethane resin adhesive, for example, a two-component urethane resin adhesive in which a main agent (Ru77t commercially available from Rock Paint Co., Ltd.) and a curing agent (H-7 commercially available from Rock Paint Co., Ltd.) are mixed can be used.

Figure 24B:
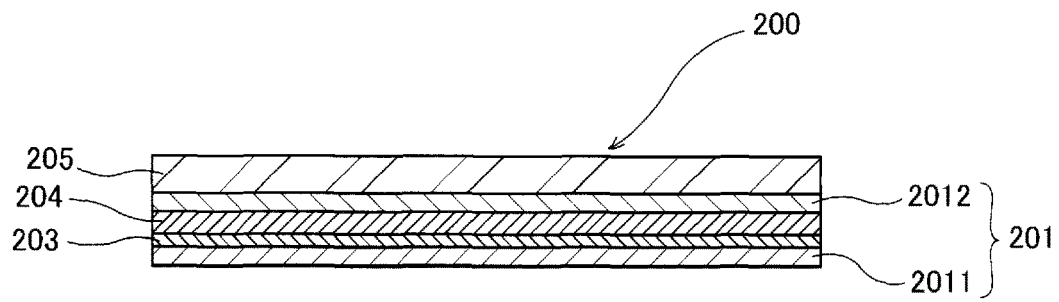
FIG. 24B is a partially enlarged cut end view showing a schematic configuration of another form of the packaging material according to one embodiment of the present disclosure.
Figure 24C:
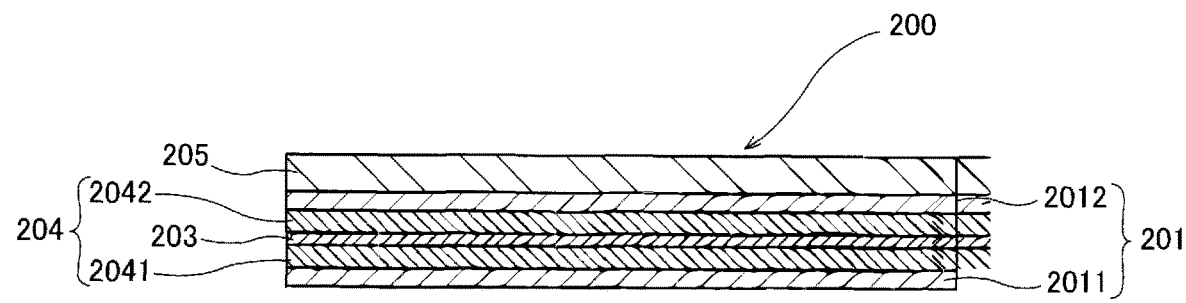
FIG. 24C is a partially enlarged cut end view showing a schematic configuration of another form of the packaging material according to one embodiment of the present disclosure.

When the resin layer 204 is formed with an adhesive, the resin layer 204 formed with an adhesive (hereinafter may be referred to as an "adhesive layer") is preferably provided between the first resin base layer 2011 and the barrier layer 203. As shown in FIG. 24B and FIG. 25C, for example, as the packaging material 200, a laminate in which the first resin base layer 2011, the resin layer 204 (adhesive layer), the barrier layer 203, the second resin base layer 2012, and the sealant layer 205 are laminated in that order and a laminate in which the first resin base layer 2011, a first resin layer 2041 (adhesive layer), the barrier layer 203, the second resin base layer 2012, a second resin layer 2042, and the sealant layer 205 are laminated in that order, and the like may be exemplified. When the bag 1000 for transporting of a silicon material is prepared using the packaging material 200 having such a configuration, since the resin layer 204 (adhesive layer) is arranged further outside the bag 1000 for transporting than the barrier layer 203, it is possible to prevent an organic component contained in the resin layer 204 (adhesive layer) from moving to the inside of the bag 1000 for transporting. Thereby, when a silicon material is accommodated in the bag 1000 for transporting, it is possible to prevent the silicon material in the bag 1000 for transporting from deteriorating. Here, examples of organic components that can be moved from the resin layer 204 (adhesive layer) include unreacted monomers such as acrylic acid and methacrylic acid. The thickness of the resin layer 204 (adhesive layer) formed with an adhesive may be, for example, about 1 µm to 5 µm, and is preferably about 2 µm to 4 µm. When the thickness of the resin layer 204 (adhesive layer) formed with an adhesive is thinner than 1 µm, there is a risk of sufficient adhesive strength not being obtained. On the other hand, when the thickness of the resin layer 204 (adhesive layer) formed with an adhesive is thicker than 5 µm, it takes time to perform a curing reaction, and thus there is a risk of a large amount of unreacted materials, the residual solvent, and the like being contained in the resin layer 204. Here, the thickness of the resin layer 204 formed of an extrusion laminate may be, for example, about 10 µm or more. The indentation elastic modulus of the resin layer 204 may be smaller than the indentation elastic modulus of the first resin base layer 2011 and the second resin base layer 2012 by one or more orders of magnitude or two or more orders of magnitude. More specifically, the indentation elastic modulus of the resin layer 204 may be about 250 MPa or less, about 150 MPa or less, or about 100 MPa or less. There is a risk of cracks occurring in the barrier layer 203 due to a relatively large difference in distortion between the layers on the both sides of the barrier layer 203, but when the indentation elastic modulus of the resin layer 204 is smaller than the indentation elastic modulus of the first resin base layer 2011 and the second resin base layer 2012 by one or more orders of magnitude, the influence of the resin layer 204 on cracks generated in the barrier layer 203 due to the difference in the distortion can be relatively reduced.

Examples of layer structures of the packaging material 200 may include the following specific examples.

[Specific Examples of Layer Structure of First Resin Base Layer 2011/Resin Layer 204/Barrier Layer 203/Second Resin Base Layer 2012/Resin Layer 204/Sealant Layer 205]

PET/adhesive layer/$AlO_x$/PET/PE/sealant layer
PET/adhesive layer/$SiO_x$/PET/PE/sealant layer
nylon/adhesive layer/$AlO_x$/PET/PE/sealant layer
nylon/adhesive layer/$SiO_x$/PET/PE/sealant layer
nylon/adhesive layer/$AlO_x$/nylon/PE/sealant layer
nylon/adhesive layer/$SiO_x$/nylon/PE/sealant layer

[Specific Examples of Layer Structure of First Resin Base Layer 2011/Barrier Layer 203/Resin Layer 204/Second Resin Base Layer 2012/Resin Layer 204/Sealant Layer 205]

PET/$AlO_x$/adhesive layer/PET/PE/sealant layer
PET/$SiO_x$/adhesive layer/PET/PE/sealant layer
nylon/$AlO_x$/adhesive layer/PET/PE/sealant layer
nylon/$SiO_x$/adhesive layer/PET/PE/sealant layer
nylon/$AlO_x$/adhesive layer/nylon/PE/sealant layer
nylon/$SiO_x$/adhesive layer/nylon/PE/sealant layer Here, in the specific examples of the layer structure, as the "sealant layer," the above sample 1, sample 2 and sample 3 and the like may be exemplified. In the specific examples of the layer structure, "AlO$_X$" indicates a vapor deposition film of alumina, and "SiO$_X$" indicates a vapor deposition film of silica. In the specific examples of the layer structure, "PET" indicates a polyethylene terephthalate layer, "nylon" indicates a nylon layer, and "PE" indicates a polyethylene layer.

Here, "further inside than the barrier layer" means that it is positioned further inside the bag 1000 for transporting than the barrier layer 203 of the packaging material 200 when the bag 1000 for transporting of a silicon material is prepared using the packaging material 200. On the other hand, "further outside the barrier layer" means that it is positioned further outside of the bag 1000 for transporting than the barrier layer 203 of the packaging material 200 when the bag 1000 for transporting of a silicon material is prepared using the packaging material 200.

The sealant layer 205 has a first surface 205A and a second surface 205B that faces the first surface 205A. In the packaging material 200, the second surface 205B of the sealant layer 205 is positioned on the side of the second resin base layer 2012. The sealant layer 205 may be a laminated structure having a first surface layer 2051 positioned on the side of the first surface 205A, a second surface layer 2052 positioned on the side of the second surface 205B, and an intermediate layer 2053 interposed between the first surface layer 2051 and the second surface layer 2052 (refer to FIG. 26), or a single-layer structure having the first surface 205A and the second surface 205B (refer to FIG. 27).

The sealant layer 205 may contain a heat-fusible resin component, and may contain, for example, a polyolefin, a cyclic polyolefin, a carboxylic acid-modified polyolefin, a carboxylic acid-modified cyclic polyolefin, or the like.

Examples of polyolefins include polyethylene such as low density polyethylene (LDPE), medium density polyethylene, high density polyethylene, and linear low density polyethylene (LLDPE); polypropylenes such as homopolypropylene, a polypropylene block copolymer (for example, a block copolymer containing propylene and ethylene), a random copolymer of polypropylene (for example, a random copolymer containing propylene and ethylene); terpolymers of ethylene-butene-propylene; and the like.

The cyclic polyolefin is a copolymer containing an olefin and a cyclic monomer, and examples of an olefin, which is a constituent monomer of a cyclic polyolefin, include ethylene, propylene, 4-methyl-1-pentene, styrene, butadiene, and isoprene. In addition, examples of a cyclic monomer, which is a constituent monomer of a cyclic polyolefin, include cyclic alkenes such as norbornene; and specifically, cyclic dienes such as cyclopentadiene, dicyclopentadiene, cyclohexadiene, and norbornadiene.

The carboxylic acid-modified polyolefin is a polymer modified by block-polymerizing or graft-polymerizing a polyolefin with a carboxylic acid. Examples of carboxylic acids used for modification include maleic acid, acrylic acid, itaconic acid, crotonic acid, maleic anhydride, and itaconic anhydride.

The carboxylic acid-modified cyclic polyolefin is a polymer obtained by copolymerizing some monomers constituting a cyclic polyolefin in place of α, β-unsaturated carboxylic acid or its anhydride, or obtained by block-polymerizing or graft-polymerizing α, β-unsaturated carboxylic acid or its anhydride with a cyclic polyolefin.

The first surface layer 2051 positioned on the side of the first surface 205A of the sealant layer 205 may be a layer containing low density polyethylene (LDPE) to which substantially no slip agent is added, the second surface layer 2052 positioned on the side of the second surface 205B may be, for example, a layer containing low density polyethylene (LDPE) to which substantially no slip agent is added, like the first surface layer 2051, and the intermediate layer 2053 interposed between the first surface layer 2051 and the second surface layer 2052 may be, for example, a layer containing linear low density polyethylene (LLDPE) to which substantially no slip agent is added. Here, in the present embodiment, "substantially no slip agent is added" means that the amount of an added component that actually improves the slipperiness of a surface of a sealant as a slip agent does not exceed an amount that actually affects the slipperiness of the surface of the sealant for the purpose of actually affecting the slipperiness of the surface of the sealant. Examples of slip agents include particles such as calcium carbonate and talc, and surfactants such as a silicone resin and a quaternary ammonium salt compound.

Since the sealant layer 205 is positioned on the innermost layer of the bag 1000 for transporting, if volatile components derived from the sealant layer 205 (outgas components derived from the sealant layer 205 and the like) adhere to a silicon material such as a contained polysilicon, silicon wafer or the like, there is a risk of defects occurring in a semiconductor device produced using the silicon material. Therefore, it is desirable that the amount of the volatile components derived from the sealant layer 205 be as small as possible. In order to reduce the amount of the volatile components derived from the sealant layer 205, it is desirable that the thickness T205 of the sealant layer 205 be as thin as possible. When the thickness T205 of the sealant layer 205 is made relatively thin, since the volatile components derived from the sealant layer 205 are released to the outside of the film, it is possible to reduce the amount of the volatile components derived from the sealant layer 205. On the other hand, when the thickness T205 of the sealant layer 205 is too thin, the resistance with respect to mechanical properties such as tensile strength may deteriorate, and there is a risk of a function of a bag for packing the contents deteriorating. In this regard, since linear low density polyethylene (LLDPE) has higher elasticity and higher resistance to bending than low density polyethylene (LDPE), if linear low density polyethylene (LLDPE) is used as the sealant layer 205, the thickness T205 of the sealant layer 205 can be made relatively thin.

In addition, after a resin case 251 is accommodated in the bag 1000 for transporting, since degassing is performed from the bag 1000 for transporting and packing is then performed, the sealant layer 205 contained in the packaging material 200 constituting the bag 1000 for transporting is required to have improved followability. In this regard, since linear low density polyethylene (LLDPE) has relatively high elasticity, if the linear low density polyethylene (LLDPE) is used, the followability of the sealant layer 205 can be improved.

It is thought that, if the sealant layer is composed of a single layer of linear low density polyethylene (LLDPE), since the indentation elastic modulus of the sealant layer composed of a single layer of linear low density polyethylene (LLDPE) can be adjusted to about 150 MPa to 600 MPa, the thickness of the sealant layer can be thinned. In addition, it can be said that it is preferable that the sealant layer be composed of a single layer of linear low density polyethylene (LLDPE) in consideration of improving the followability of the sealant layer. However, since the pressure during polymerization of linear low density polyethylene (LLDPE) is lower than the pressure during polymerization of low density polyethylene (LDPE), low-molecular-weight components are more likely to volatilize in linear low density polyethylene (LLDPE) than in low density polyethylene (LDPE). Therefore, it is thought that, if the sealant layer is composed of a single layer of linear low density polyethylene (LLDPE), even if the thickness of the sealant layer can be thinned, there is a risk of volatile components derived from the sealant layer contaminating the silicon material. In addition, it is thought that, since linear low density polyethylene (LLDPE) tends to be less slippery than low density polyethylene (LDPE), if the sealant layer is composed of a single layer of linear low density polyethylene (LLDPE), there is a risk of the slipperiness of the surface of the sealant layer being reduced. Since it is preferable that the sealant layer 205 used in the bag 1000 for transporting be substantially free of a slip agent that may become a foreign substance, it is preferable to improve the slipperiness by a method other than use of the slip agent. In the present embodiment, the intermediate layer 2053 containing linear low density polyethylene (LLDPE) may be interposed between the first surface layer 2051 and the second surface layer 2052 which contain low density polyethylene (LDPE). Therefore, in the sealant layer 205 of the bag 1000 for transporting, the thickness T205 can be made relatively thin, the followability and slipperiness are improved, and it is possible to prevent low-molecular-weight components from volatilizing from linear low density polyethylene (LLDPE) contained in the intermediate layer 2053.

The sealant layer 205 having a single-layer structure (refer to FIG. 27) may contain low density polyethylene (LDPE) and linear low density polyethylene (LLDPE). In the sealant layer 205, the mixing ratio of low density polyethylene (LDPE) and linear low density polyethylene (LLDPE) may be about 50:50 to 70:30. In this manner, when the amount of low density polyethylene (LDPE) added is equal to or larger than the amount of linear low density polyethylene (LLDPE) added, the abundance of low density polyethylene (LDPE) on the side of the first surface 205A of the sealant layer 205 can increase, and an effect of thinning the thickness T205 of the sealant layer 205 due to linear low density polyethylene (LLDPE), that is, an effect of preventing low-molecular-weight components from volatilizing, is achieved. Here, when viewed in a thickness direction of the sealant layer 205, low density polyethylene (LDPE) and linear low density polyethylene (LLDPE) may be substantially uniformly provided, and low density polyethylene (LDPE) may be unevenly distributed on the side of the first surface 205A and on the side of the second surface 205B.

The thickness T205 of the sealant layer 205 can be appropriately set according to the thickness of the bag 1000 for transporting composed of the packaging material 200 and the like, and may be, for example, about 35 μm to 60 μm.

Figure 26:
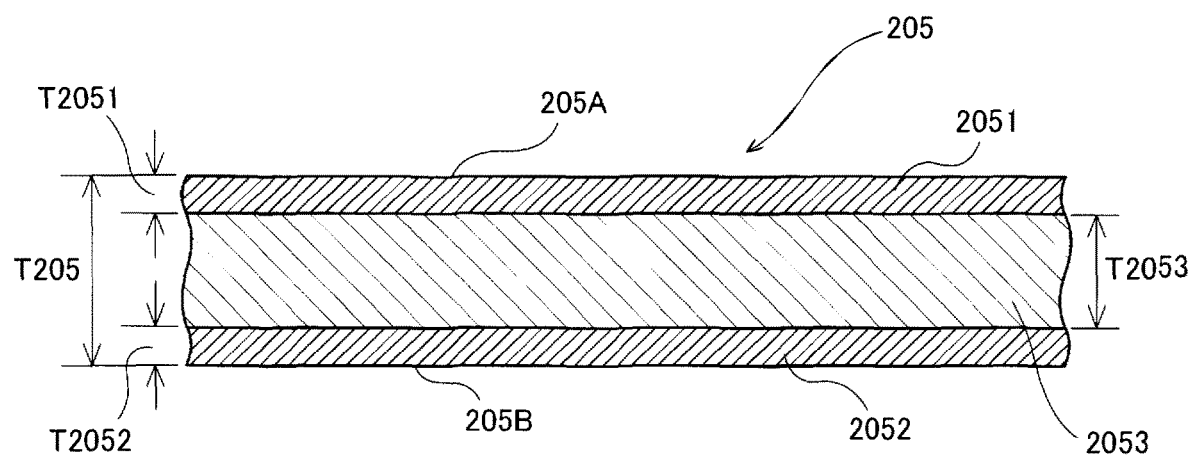
FIG. 26 is a partially enlarged cut end view showing a schematic configuration of one form of a sealant according to one embodiment of the present disclosure.
Figure 27:
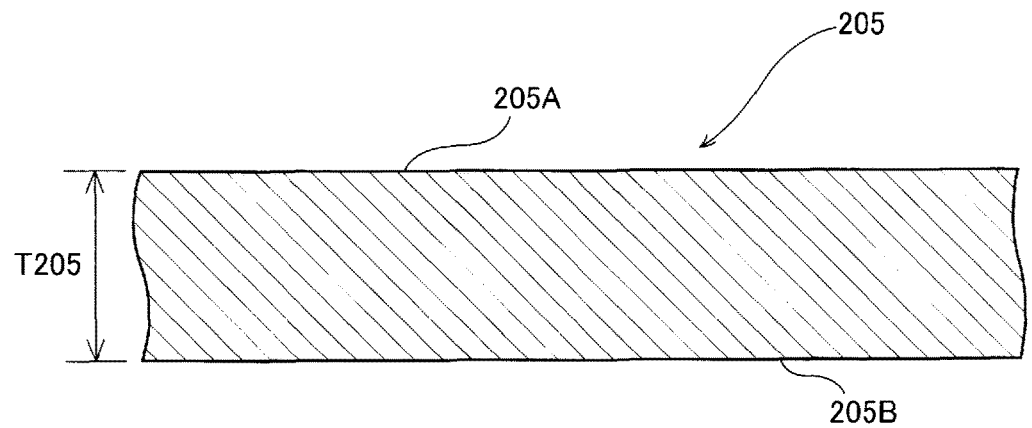
FIG. 27 is a partially enlarged cut end view showing a schematic configuration of another form of the sealant according to one embodiment of the present disclosure.

In the form shown in FIG. 26, when the first surface layer 2051 containing low density polyethylene (LDPE) and the second surface layer 2052 containing low density polyethylene (LDPE) are arranged with the intermediate layer 2053 interposed therebetween, the internal stress on one side of the sealant layer 205 and the internal stress of the other side thereof cancel each other out to some extent, and curling of the sealant layer 205 can be minimized. In addition, in the form shown in FIG. 26, the thicknesses T2051 and T2052 of the first surface layer 2051 and the second surface layer 2052 are both thinner than the thickness T2053 of the intermediate layer 2053. When the thicknesses T2051 and T2052 of the first surface layer 2051 and the second surface layer 2052 are thinner than the thickness T2053 of the intermediate layer 2053, predetermined followability can be imparted to the sealant layer 205. The ratio of the thickness T2051 of the first surface layer 2051 and the thickness T2053 of the intermediate layer 2053 may be about 1:1 to 10, and is preferably about 1:2 to 3. When the ratio of the thicknesses is within the above range, sufficient followability due to low density linear polyethylene (LLDPE) contained in the intermediate layer 2053 can be imparted to the sealant layer 205, and the indentation elastic modulus of the sealant layer 205 can be within a range of 300 MPa to 500 MPa. Here, the indentation elastic modulus can be measured using a microhardness tester (product name "PICODENTOR HM500," commercially available from Fischer Instruments K.K.).

It is known that the sealing strength of the sealant can be controlled by the sealing temperature, the sealing pressure, the sealing time and the like during heat sealing. Generally, when the sealing temperature is higher, the sealing strength tends to be higher, but if the sealing temperature is too high, the sealant melts more than necessary, and there is a risk of the sealing strength being lowered. In the present embodiment, under heat sealing conditions of a sealing temperature of 150° C., a sealing pressure of 0.1 MPa, and a sealing time of 1 second, the sealing strength when the first surfaces 205A of the sealant layer 205 are sealed to each other may be 30 N/15 mm or more, and is preferably 50 N/15 mm or more and less than 60 N/15 mm. When the sealing strength is less than 30 N/15 mm, during transportation of the package 50 of the silicon material packaged in the bag 1000 for transporting composed of the packaging material 200 having the sealant layer 205, there is a risk of a heat-sealed part (for example, a top heat-sealed part HST21 (refer to FIG. 30 and FIG. 31)) of the bag 1000 for transporting of the silicon material being peeled off.

As described above, it is thought that, in order to make the thickness T205 of the sealant layer 205 relatively thin, it is preferable to use linear low density polyethylene (LLDPE) as a constituent material of the sealant layer 205. However, in a sealant layer composed of linear low density polyethylene (LLDPE), the sealing temperature required to obtain a predetermined sealing strength becomes relatively high. In this regard, in the present embodiment, when the first surface layer 2051 of the sealant layer 205 contains low density polyethylene (LDPE), the sealing temperature required to obtain a predetermined sealing strength can be relatively lowered.

The haze of the sealant layer 205 in the present embodiment may be 25% or less, and is preferably 20% or less. When the haze of the sealant layer 205 is 20% or less, the visibility inside the bag 1000 for transporting can be improved. In addition, before the silicon material is packaged in the bag 1000 for transporting of a silicon material, it is possible to check whether a foreign substance is adhered to the first surface 205A of the sealant layer 205, and it is also possible to prevent contamination of the silicon material before it happens. Here, the haze of the sealant layer 205 can be measured according to JIS-K 7136 using, for example, a haze meter (product name: HM-150, commercially available from Murakami Color Research Laboratory Co., Ltd.).

The sealant layer 205 having the above configuration can be produced using a conventionally known film forming method. For example, the sealant layer 205 having the configuration shown in FIG. 26 can be produced by laminating the second surface layer 2052, the intermediate layer 2053 and the first surface layer 2051 using a coating method such as a die coating method and an inflation method. Similarly, the sealant layer 205 having the configuration shown in FIG. 27 can be produced using the above coating method, extrusion inflation method, or the like.

The barrier layer 203 in the present embodiment may be, for example, a vapor deposition film formed by vapor-depositing an inorganic oxide such as silica or alumina on, for example, a PET layer. When the packaging material 200 has the barrier layer 203, it is possible to prevent a gas or the like that contaminates the surface of the contained silicon materials 252 and 253 from entering to the inside from the outside of the bag 1000 for transporting. The barrier layer 203 may be a metal vapor deposition film formed by vapor-depositing a metal such as aluminum on the first resin base layer 2011 or the second resin base layer 2012, or a metal foil such as aluminum. When the barrier layer 203 is such a metal vapor deposition film or metal foil, transparency is not secured in the bag 1000 for transporting, but not only a barrier property but also a light shielding property can be imparted to the bag 1000 for transporting. In addition, in this form, when the sealant layer 205 has predetermined transparency, it is possible to more easily check whether a foreign substance is adhered to the first surface 205A of the sealant layer 205 in the bag 1000 for transporting.

As described above, when the silicon material is packaged in the bag 1000 for transporting of a silicon material (refer to FIG. 28 and FIG. 29), the sealant layer 205 has transparency to the extent that the inside of the bag 1000 for transporting can be visually recognized. Therefore, in the packaging material 200 having the sealant layer 205, similarly, it is desirable to have transparency to the extent that the inside of the bag 1000 for transporting can be visually recognized. In such a point of view, the haze of the packaging material 200 according to the present embodiment may be, for example, 30% or less, and is preferably 25% or less. When the haze of the packaging material 200 exceeds 30%, the visibility inside the bag 1000 for transporting produced from the packaging material 200 deteriorates, and there is a risk that it will be difficult to check whether a foreign substance is adhered to the first surface 205A of the sealant layer 205 in the bag 1000 for transporting. Here, the haze of the packaging material 200 can be measured according to JIS-K 7136 using, for example, a haze meter (product name: HM-150, commercially available from Murakami Color Research Laboratory Co., Ltd.).

Figure 25:
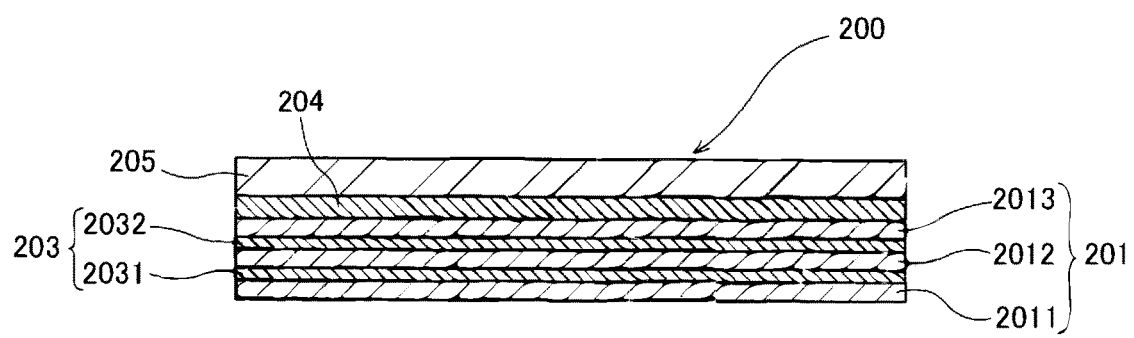
FIG. 25 is a partially enlarged cut end view showing a schematic configuration of another form of the packaging material according to one embodiment of the present disclosure.

Here, the packaging material 200 according to the present embodiment may have a plurality of barrier layers. For example, as shown in FIG. 25, the packaging material 200 may be a laminate including the first resin base layer 2011 (the resin base layer 201), a first barrier layer 2031 (the barrier layer 203), the second resin base layer 2012 (the resin base layer 201), a second barrier layer 2032 (the barrier layer 203), a third resin base layer 2013 (the resin base layer 201), the resin layer 204 and the sealant layer 205 in that order. In this form, the first resin base layer 2011 and the second resin base layer 2012 may be composed of a polyester-based resin material or a polyamide-based resin material, but the third resin base layer 2013 is preferably composed of a polyester-based resin material. In addition to the above forms, for example, the packaging material 200 may be a laminate including the first resin base layer 2011 (the resin base layer 201), the first barrier layer 2031 (the barrier layer 203), the second resin base layer 2012 (the resin base layer 201), the resin layer 204, the second barrier layer 2032 (the barrier layer 203), the third resin base layer 2013 (the resin base layer 201) and the sealant layer 205 in that order, and may be laminate including the first resin base layer 2011 (the resin base layer 201), the resin layer 204, the first barrier layer 2031 (the barrier layer 203), the second resin base layer 2012 (the resin base layer 201), the second barrier layer 2032 (the barrier layer 203), the third resin base layer 2013 (the resin base layer 201) and the sealant layer 205 in that order. Here, in these forms of the packaging material 200, as described above, a plurality of resin layers 204 may be provided.

The bag 1000 for transporting of a silicon material in the present embodiment is a packaging bag that becomes substantially rectangular (substantially rectangular parallelepiped) when it is unfolded, and is composed of a first side surface film 211, a second side surface film 212, a first gusset film 213 and a second gusset film 214. The first side surface film 211, the second side surface film 212, the first gusset film 213 and the second gusset film 214 are all composed of the packaging material 200 according to the present embodiment. Here, the bag 1000 for transporting may not include the first gusset film 213 and the second gusset film 214. In this case, the first side surface film 211 and the second side surface film 212 may be heat-sealed at three side edges so that the first surfaces 205A of the sealant layers 205 face each other.

The bag 1000 for transporting has a configuration in which the first surface 205A of each sealant layer 205 of the first side surface film 211, the second side surface film 212, the first gusset film 213 and the second gusset film 214 is positioned on the innermost surface, and the first resin base layer 2011 is positioned on the outermost surface.

In the bag 1000 for transporting, a first heat-sealed part HS211 formed by superimposing one of two opposing side edges of the first side surface film 211 and one of two opposing side edges of the folded first gusset film 213, and welding them by heat sealing is formed, and a second heat-sealed part HS212 formed by superimposing the other of the side edges of the first side surface film 211 and one of two opposing side edges of the folded second gusset film 214, and welding them by heat sealing is formed. In addition, a third heat-sealed part HS213 formed by superimposing one of two opposing side edges of the second side surface film 212 and the other of the side edges of the folded first gusset film 213, and welding them by heat sealing is formed, and a fourth heat-sealed part HS214 formed by superimposing the other of the side edges of the second side surface film 212 and the other of the side edges of the folded second gusset film 214, and welding them by heat sealing is formed. A bottom heat-sealed part HSB21 formed by superimposing respective side edges of the first side surface film 211 and the second side surface film 212, and welding them by heat sealing is formed, and respective side edges of the first side surface film 211 and the second side surface film 212, which are positioned to face the bottom heat-sealed part HSB21, form an opening 215 of the bag 1000 for transporting without being heat-sealed.

When a large number of bags for transporting 1000 in which the first gusset film 213 and the second gusset film 214 are folded are stacked, if the first side surface film 211 or the second side surface film 212 is sucked and held, and lifted upward, the opening 215 can be opened. From the opening 215 that is opened, the resin case 251 for storing the silicon materials 252 and 253 (refer to FIG. 30 and FIG. 31) is accommodated in the bag 1000 for transporting, respective side edges of the first side surface film 211 and the second side surface film 212 at the opening 215 are superimposed and heat-sealed, and thus the top heat-sealed part HST21 is formed. In this manner, the package 250 of the silicon material can be prepared.

Generally, when a silicon material is packed in a bag, the silicon material is accommodated in the bag and the inside of the bag is then degassed and vacuum-packed. In the vacuum-packed package, a predetermined stress is applied to the packaging material constituting the bag. In the packaging material, when polyethylene terephthalate (PET) is provided on one side of a vapor deposition layer (barrier layer) of aluminum oxide, and low density polyethylene (LDPE) or linear low density polyethylene (LLDPE) is provided on the other side (refer to PTL 2), a difference occurs between distortion of PET positioned on one side of the barrier layer and distortion of polyethylene (LDPE and LLDPE) positioned on the other side thereof when stress is applied to the packaging material, the barrier layer cannot follow this difference in distortion, and there is a risk of cracks occurring in the barrier layer. If cracks occur in the barrier layer, a barrier function of blocking permeation of oxygen, water vapor, and the like deteriorates.

In addition, even if the package in which the silicon material is packed in the bag is exposed to a relatively high temperature and high humidity environment, there is a risk of cracks occurring in the barrier layer due to a difference in elongation rate between PET positioned on one side of the barrier layer and polyethylene (LDPE and LLDPE).

In the bag 1000 for transporting in the present embodiment, since the first resin base layer 2011 and the second resin base layer 2012 are positioned on both sides of the barrier layer 203, even if a predetermined stress is applied to the bag 1000 for transporting (the packaging material 200), it is difficult for a large distortion difference to occur between the first resin base layer 2011 and the second resin base layer 2012, and it is possible to prevent cracks from occurring in the barrier layer 203.

In addition, low density polyethylene (LDPE) is contained on the side of the first surface 205A of the sealant layer 205 positioned on the innermost layer of the bag 1000 for transporting, and linear low density polyethylene (LLDPE) is contained on the side of the second surface 205B. According to linear low density polyethylene (LLDPE) constituting the sealant layer 205, the thickness T205 of the sealant layer 205 can be made relatively thin, and the followability can be improved, and according to low density polyethylene (LDPE) contained on the side of the first surface 205A of the sealant layer 205, it is possible to prevent low-molecular-weight components from volatilizing from linear low density polyethylene (LLDPE). In addition, when predetermined transparency is secured in the sealant layer 205, it is possible to easily check whether a foreign substance is adhered to the first surface 205A of the sealant layer 205 in the bag 1000 for transporting.

The embodiments described above are described for facilitating the understanding of the present disclosure, and are not described for the purpose of limiting the present disclosure. Therefore, elements disclosed in the above embodiments are intended to include all design modifications, equivalents and the like belonging to the technical scope of the present disclosure.

The package 50 of a silicon material (refer to FIG. 7 and FIG. 8) in the above embodiment may include the package 10 for transporting of a silicon material as the inner bag, and further include an outer bag having the same configuration as the inner bag, and in this case, the silicon materials 52 and 53 may be accommodated in the package 10 for transporting of a silicon material as the inner bag, and may be additionally accommodated in the outer bag. The packaging material constituting each of the first side surface film 11, the second side surface film 12, the first gusset film 13 and the second gusset film 14 of the outer bag may be the packaging material 3 having the configuration shown in FIG. 3 and FIG. 4, and may be a laminate in which a resin film having an antistatic function (for example, a nylon film with an antistatic layer (product name: BONYLAS, commercially available from KOHJIN Film & Chemicals Co., Ltd.)), the gas barrier layer 5, the first resin layer 41 and the sealant 1 are laminated in that order.

The package 10 for transporting of a silicon material (refer to FIG. 6) in the above embodiment may include neither the first gusset film 13 nor the second gusset film 14. In this case, the first side surface film 11 and the second side surface film 12 may be heat-sealed at three side edges so that the first surfaces 2A of the sealants 1 face each other.

In the above embodiment, the bag 1000 for transporting of a silicon material (refer to FIG. 29) may be a double packaging bag including a first bag as a so-called outer bag and a second bag as a so-called inner bag, which is arranged in the first bag. In this case, at least the second bag may be composed of the packaging material 200 according to the above embodiment, and the first bag is also preferably composed of the packaging material 200.

The invention claimed is:

1. A package of a silicon material, comprising:
a package for transporting of a silicon material; and
a silicon material that is accommodated in the package for transporting of a silicon material, wherein
the package for transporting of a silicon material is composed of a packaging material,
the packaging material comprises a base composed of a resin material, and a sealant which is provided on one side of the base,
the sealant comprises a sealant base having a first surface and a second surface that is on an opposite side of the sealant base from the first surface,
the sealant base is a laminate structure that has:
  a first surface layer including the first surface,
  a second surface layer including the second surface, and
  an intermediate layer interposed between the first surface layer and the second surface layer,
the first surface layer and the second surface layer are composed of low density polyethylene (LDPE),
the intermediate layer consists of linear low density polyethylene (LLDPE),
the low density polyethylene (LDPE) contained in the first surface layer and the second surface layer is low density polyethylene to which substantially no slip agent is added,
the linear low density polyethylene (LLDPE) contained in the intermediate layer is linear low density polyethylene to which substantially no slip agent is added,
the sealant is provided so that the second surface is brought into contact with one side of the base, and
the silicon material is polysilicon or a silicon wafer.

2. The package of a silicon material according to claim 1, wherein a thickness of the intermediate layer is thicker than a thickness of the first surface layer and the thickness of the second surface layer.

3. The package of a silicon material according to claim 1, wherein the packaging material further comprises a gas barrier layer that is provided on the other side of the base.

* * * * *